US005495576A

United States Patent [19]
Ritchey

[11] Patent Number: 5,495,576
[45] Date of Patent: * Feb. 27, 1996

[54] PANORAMIC IMAGE BASED VIRTUAL REALITY/TELEPRESENCE AUDIO-VISUAL SYSTEM AND METHOD

[76] Inventor: Kurtis J. Ritchey, 26374 Tonganoxie Rd., Leavenworth, Kans. 66048

[*] Notice: The portion of the term of this patent subsequent to Jul. 14, 2009, has been disclaimed.

[21] Appl. No.: 2,582

[22] Filed: Jan. 11, 1993

[51] Int. Cl.⁶ .................................................. G06T 15/10
[52] U.S. Cl. .......................................... 395/125; 395/154
[58] Field of Search ..................................... 395/119, 125, 395/130, 154, 50, 902, 2.55, 2.6, 2.79, 2.85; 345/139, 158, 184

[56] References Cited

U.S. PATENT DOCUMENTS

| 4,868,682 | 9/1989 | Shimizu et al. | 358/335 |
| 4,951,040 | 8/1990 | McNeil et al. | 340/729 |

Primary Examiner—Mark K. Zimmerman
Attorney, Agent, or Firm—Litman, McMahon, & Brown; Dennis Crawford

[57] ABSTRACT

An improved panoramic image based virtual reality/telepresence audio-visual system and method includes panoramic three-dimensional input devices, a computer processor, and a panoramic audio-visual output device. In one embodiment of the system the input devices comprise a sensor assembly including a plurality of positionable radar, camera, and acoustical sensors for recording signatures of all sides of three-dimensional subjects simultaneously. The computer processor integrates the sensor signals, processes signals as a virtual model, updates the model based on participant interaction, and selects and distributes portions of the processed virtual model for presentation on display units and audio speakers. The processor includes participant interactive input devices for instantaneous interaction with the virtual model. The panoramic audio-visual output device includes a head-mounted display or a closed structure having contiguous individual display units mounted in all viewable directions surrounding the participant. Conventional, stereoscopic, autostereoscopic, and holographic display systems are provided to view the panoramic three-dimensional image based model. Computer graphics, artificial intelligence, telecommunications, and vehicle control embodiments of the system are provided.

26 Claims, 13 Drawing Sheets

PANORAMIC IMAGE BASED VIRTUAL REALITY/TELEPRESENCE AUDIO-VISUAL SYSTEM AND METHOD

BACKGROUND OF THE INVENTION

1. Field of the Invention

This invention relates generally to panoramic display methods and more particularly to the sensor fusion of data from the panoramic arrangement of three-dimensional imaging sensors and surface contour sensors to form virtual objects and scenes, the processing of the virtual objects and scenes based on a viewer operating interactive computer input devices to affect the manipulation of the virtual objects and scenes defined in the computer, and the display of the affected virtual objects and scenes on a panoramic display unit to the extent that the viewer perceives that the virtual objects and scenes completely surround the viewer.

2. Description of the Related Art

My previous U.S. Pat. No. 5,130,794 describes a panoramic image based virtual reality system that incorporates a multi-lens camera system with spherical field-of-view (FOV) coverage. As shown in FIG. 2, objective lenses of the '794 camera system face outward with adjacent or overlapping FOV coverage. The imagery from the camera is surface mapped onto the interior of a three-dimensional(3-D) shape defined in a special effects processor of a computer. Alternatively, the input source is at least one computer graphics system that generates three-dimensional graphics of spherical FOV coverage. The viewer operates interactive input devices associated with the computer to manipulate the texture mapped virtual images. The virtual environment is instantaneously affected before the viewer and displayed on either a head-mounted display assembly or on contiguous display units positioned beneath, to the sides, and above the viewer.

Limitations of the panoramic video camera system in '794 are that the panoramic camera does not record a non-spherical field of view(FOV) and does not incorporate a non-contact shape sensor.

An improvement over the existing system is proposed in my Disclosure Document No. 197612, specifically FIG. 15, filed with the U.S. Patent and Tradmark Office in February 1986, and in my recent paper entitled "Image Based Panoramic Virtual Reality System", presented at the SPIE/IS&T Symposium on Electronic Imaging: Science & Technology 92; Visualization, Holography, and Stereographics; Visual Data Interpretation, Paper No. 1168-02, on Feb. 9, 1992.

In these documents a multi-lens camera system with positionable taking lenses is described. Taking lenses of the camera are faced inward or outward to record imagery of a subject in an continuous simultaneous manner. By combining panoramic visual field of view sensor data with associated shape sensor data a realistic panoramic image based three-dimensional computer generated model is rendered. Imagery from the camera is surface mapped onto the surface of a three-dimensional shape defined in a computer. The shape is input by a panoramic 3-D digitizer device. Audio data is input by a panoramic 3-D audio system. Audio attributes are assigned to subjects in the model. Shape, imagery, and audio sensors may be combined to form one sensor array. Sensors are positioned adjacent to one another to facilitate adjacent or overlapping coverage of a subject. Preferably corresponding panoramic shape, imagery, and audio signatures of a subject(s) are collected simultaneously.

In this manner action of a 3-D subject is recorded from substantially all aspects at a single moment in time. The participant operates interactive input devices associated with the computer to manipulate the virtual object. In one example, the participant observes the model on a head mounted display system. In another example, the participant is surrounded by contiguous audio-visual display units. In the latter example, each display unit displays a segment of the model.

It is therefore the objective of this invention to provide a more versatile image based panoramic virtual reality and telepresence system and method. Still another objective is to produce systems and methods for recording, formatting, processing, displaying, and interacting with data representing 3-D beings, objects, and scenes. More specifically, an objective of this invention is to provide a positionable multi-lens camera system for recording contiguous image segments of an object, being, adjacent surrounding scene, or any combination of these types of subjects; a signal processing means comprising first computerized fusion processing system for integrating the positional camera system with corresponding digitized shape and contour data; a second computerized fusion processing system for integrating first fused data with other fused data representing adjacent portions of a being, object, or scene comprising a panoramic computer generated model; where various 3-D digitizer systems may be incorporated for entering 3-D shape and contour data into a image processing computer; a third processing means to manipulate the geometry of subjects comprising the virtual model; a forth processing means for sampling out given fields of regard of the virtual model for presentation and distribution to display units and audio speakers; where signal processing means includes an expert system for determining the actions of subjects of the computer generated model; where the signal processing means includes image segment circuit means for distributing, processing, and display of the model; where the system includes a 3-D graphics computer system for the generation, alteration, and display images; and a system and method for image based recording of 3-D data which may be processed for display on various 3-D display systems to include head mounted display systems, and room display systems with stereographic, autostereoscopic, or holographic display systems.

It is also an objective of this invention to provide interactive input devices operable by a viewer to cause the generation, alteration, display of 3-D images on said display assembly means; to provide associated 3-D audio systems; to provide alternative viewer interactive and feedback devices to operate the interactive input devices and associated processing means such that the resultant virtual environment is simultaneously effected before the viewers eyes; to provide an associated telecommunications system; and to provide a system for incorporation with a host vehicle, teleoperated vehicle, or robot.

LISTED PARTS IN DRAWINGS

Figure 1:
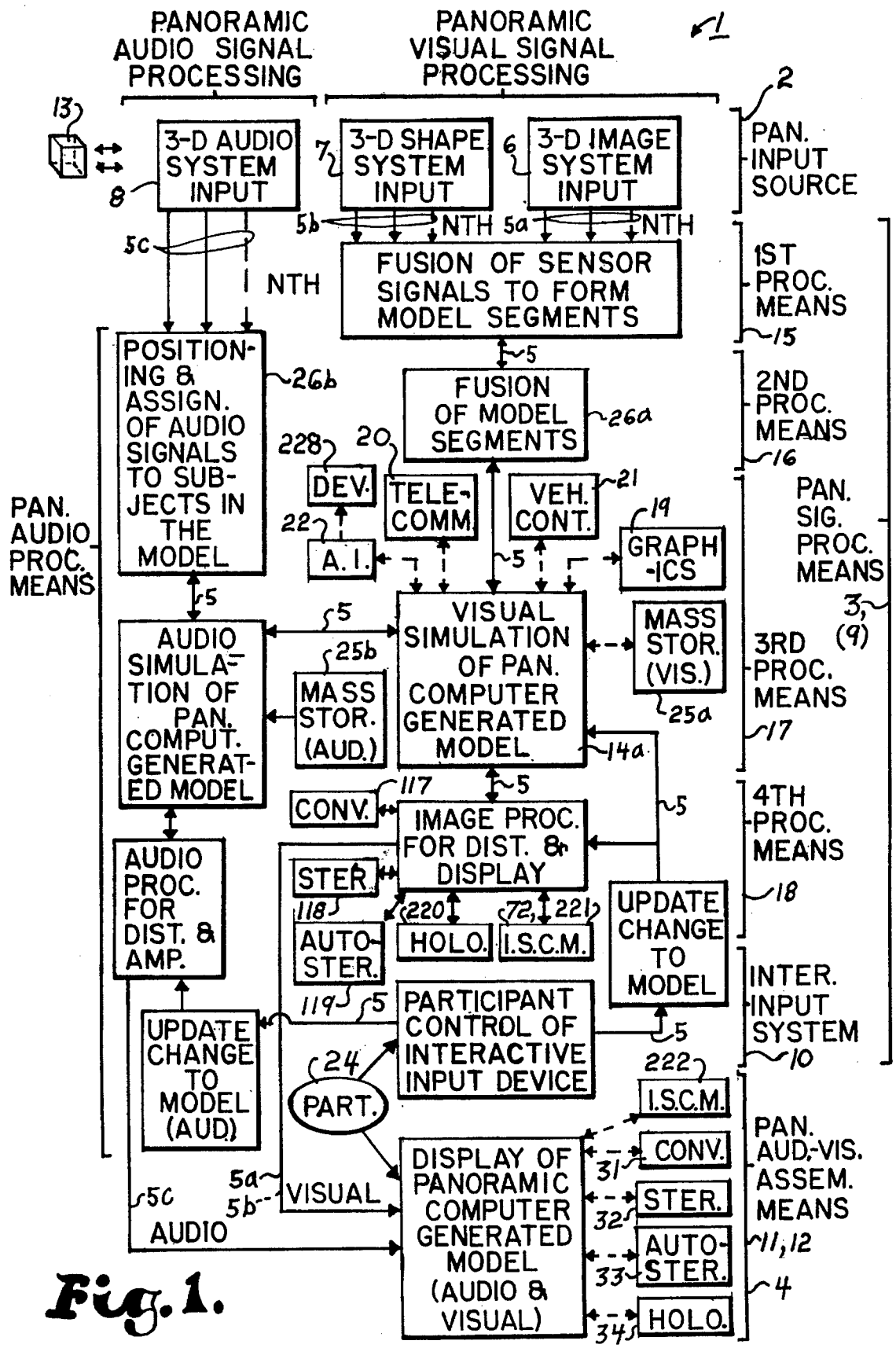
FIG. 1 is a flowchart to which reference will be made in generally explaining the overall operation of the recording, processing, and audio-visual system 1 according to the present invention.

1: Improved panoramic image based virtual reality/telepresenc audio-visual system and method
2: Panoramic 3-D input source means
3: Panoramic 3-D signal processing means
4: Panoramic audio-visual presentation means
5: Suitable electrical interface means and assoiciated signal(general)
   (5a: video signal means)
   (5b: digital shape signal means)
   (5c: audio signal means)
6: Panoramic 3-D camera system
7: Panoammic 3-D digitizing system
8: Panoramic 3-D audio recording system
9: Host computer system
10: Interactive input system
11: Head-mounted display(HMD) system
12: Large display assembly
13: Subject
   (13a: being)
   (13b: object)
   (13c: scene)
      (–a: side a)
      (–b: side b)
      (–c: side c), etc.
14: Computer generated virtual world model
   (14a: visual and shape model)
   (14b: audio model)
      (–a: modeled being)
      (–b: modeled object)
      (–c: modeled scene)
15: First processing means; fusion processor to wed shape and image segments.
16: Second processing means; fusion of model segments.
17: Third processing means; host simulation computer for manipulating world model; geometry processor.
18: Forth processing means; image processing for display and distribution.
19: Computer graphics system
20: VRT telecommunications system
21: VRT vehicle control system
22: Artificial intelligence system
23: Audio processing system
24: Participant; viewer/operator)
   (24a: first participant)
   (24b: second participant)
25: Mass storage device
   (25a: visual and shape mass storage)

(25b: audio data mass storage)
26: Panoramic model segments
 (26a: visual and shape model segment)
 (26b: audio model segment)
27: Sensor(s)
28: Image sensor(s)
29: Shape sensor(s)
30: Audio(Accoustical) sensor(s)
31: Conventional display unit(s)
32: Stereographic display unit(s)
33: Autostereoscopic display unit(s)
34: Holographic display unit(s)
35: Audio speaker(s)
36: Sensor array
37: Camera
38: Radar
39: Microphone
40: Array housing
41: Overlapping field of regard coverage of sensors.
42: Edge of adjacent field of regard coverage of sensors.
43: Rigid transparent support
44: Array assembly
45: Screw
46: Support armature
47: Panoramic optical assembly arrangement
48: Objective lens
49: Light sensitive surface of the camera
50: Fiber-optic image conduit(bundle)
51: Focusing lens
52: Camera housing
53: Charge Coupled Device(CCD)
54: Sheathing of image conduit
55: Shape data(wireframe) representing subject model
56: Image data representing a subject
 (56a: being)
 (56b: object)
 (56c: scene)
57: Audio data representing a subject
 (57a: being)
 (57b: object)
 (57c: scene)
58: Viewing space
59: Head position of participant
60: Hand location of participant
61: Sample frame of panoramic camera
62: Transimitter; for transmitting an over-the-air stereo audio signal.
63: Receiver; for recieiving an over-the-air stereo audio signal.
64: Stereo audio headphones
65: Structural supports of the large display assembly
66: Graphics input system
67: Videotape player
68: Videodisc player
69: Video analog-to-digital converter
70: Display unit; generally; may include audio system.
71: Displayed scene
72: Image segment circuit means
73: Image control unit (including chasis, processors, etc.); may include audio means.
74: Polygonal surfaces of model 14a
75: Head position of viewer
76: Position sensing system sensor
77: Position sensing system source
78: Position sensing system electronics unit
79: Audio signal to means 4
80: Video signal to means 4
81: Display unit viewing surface
82: Position and orientation data and associated conductor from interactive input system 10
83: Source conductor line
84: Sensor conductor line
85: Radar antenna
86: Radar waveguide
87: Radar transmitter/reciever
88: Master clock
89: Conventional signal router/switcher
90: 3-D display unit; generally.
91: 3-D display system embodiment of system 1.
92: Encoder/compressor
93: Encryptor
94: Modem
95: Decryptor
96: Decoder/expander
97: Non-contact position and orientation sensor system (i.e. Radar or LADAR); may include camera system.
98: Digital data network
99: Telephone line
100: Edge of projected image
101: Floor of large assembly
102: Host vehicle
103: Host vehicle controls
104: Host vehicle control surfaces and motors.
105: Rear projection screen
106: Entry/exit assemblies for assembly 12
107: Structural support, framework, and fasteners for large assembly 12.
108: Remotely piloted vehicle
109: Tranceiver; for sending and recieving radio frequency(RF) over-the-air digital data.
110: Over-the-air RF digital data link
111: Participant support means
112: Remote vehicle control system
113: Remote vehicle control surfaces and motors
114: Remote vehicle manipulators
115: Timing signal conductor
116: Model signal conductor
117: Processing means for conventional TV
118: Processing means for stereo display TV
119: Processing means for autostereoscopic TV
220: Processing means for holographic TV
221: Processing and distribution system for image segment circuit means
222: Audio-visual units of image segment circuit means
223: Hemispherical scan of LADAR system; may include integral registered camera system.

224: Near field of view of LADAR system; may include integral registered camera system.

225: VRT control station for remotely piloted vehicle

226: Video compression and data system (including communications buffer)

227: Video decompression and data system (including communications buffer)

228: Peripherial devices

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for teaching one skilled in the art to variously employ the present invention in virtually any appropriately detailed structure.

For clarity of description, a preliminary summary of the major features of the recording, processing, and display portions of a preferred embodiment of the system is now provided, after which individual portions of the system will be described in detail.

Referring to the drawings in more detail.

As shown in FIG. 1 the reference 1 generally designates a system and method of rendering and interacting with a three-dimensional (3-D) computer generated model that comprises the virtual reality/telepresence system 1 presented to a participant 24. The system 1 generally includes a panoramic input source means 2, panoramic signal processing means 2, and panoramic audio-visual presentation assembly means 2 connected generally by suitable electrical interface means 2. Electrical interface means 2, including the appropriate conductor, input/output port or jack interconnections, and associated signal, is indicated by lines and arrows in the drawings. Optional or alternative interface means and devices are indicated by dashed lines in the drawings. Input means 2, generally consists of a panoramic 3-D camera system 6, a panoramic 3-D digitizing system 7, and a panoramic 3-D audio recording system 8. Input means 6, 7, and 8 include a plurality of respective sensors that are positioned to record geographic and geometric subjects. A subject 13 may comprise three-dimensional beings or things in the real world. The world model 14 comprises a model 14a that includes shape and imagery, and an audio model 14b that includes accoustical recordings. The audio model corresponds to the shape and imagery model. Preferably, all sides of the subject are recorded simultaneously by the input means 6, 7, and 8.

Signal processing means 3 preferably includes a first computer processing means 15 for sensor fusion of the resulting imagery signal 5a and shape data signal 5b. The first processing means operates on the signals 5a and 5b to combine shape and surface data of corresponding segments of the 3-D subject. The resulting 3-D model segments 26a are portions of the computer generated world model 14a. Signal processing means 3 preferably also includes a second computer processing means 16 for fusion of imaging and shape data segments 26a derived by first apparatus 15 to form a continuous panoramic world model 14. Signal processing means 3 also includes a third computer processing means 17 for manipulating the computer generated model 14a. The third processing means is typically operated to perform interactive 3-D visual simulation and teleoperated applications. Signal processing means 3 also includes a fourth computer processing means 18 to sample out and transmit image scene 71 (FIG. 24) segments of the world model 14a to each respective display unit of the audio-visual assembly means 2. Means 2 includes processing means for interfacing with input sources 2, peripheral computer data entry and manipulation apparatus refered to as an interactive input system 10, and assembly 4. Signal processing means 15, 16, 17, 18, and 23 (FIG. 17) include a central processing unit, terminal bus, communication ports, memory, and the like typical to a conventional computer(s). Operating system software, board level software, processing data, generated images and the like are stored in mass storage devices 25 which may include disk drives, optical disk drives, and so forth. All signal processing means 15, 16, 17, 18, and 23 may be incorportated into a single computer 9 or a plurality of networked computers (9 to the nth) housed in a single or separate chassis. Additionally, means 3 may include a computer graphics system 19, a telecommunications system 20, a vehicle control system 21, or artificial intelligence system 22 to perform special processing functions. Special processing systems 19, 20, 21, and 22 may be integral or networked to computer 9.

Audio sensors 30 are faced inward about a subject or outward to record signals representing audio segments 26b of a surrounding subject. Preferably, the image, shape, and audio sensors 28, 29, and 30 (FIG. 5) respectively, are positioned adjacent to one another and record a continuous corresponding subject 13. The audio processing system 23 receives recorded audio signals 5c from the panoramic 3-D audio input system 1. The audio signals 5c as assigned to modeled subject 14a comprise an accoustical world model 14b. The audio model 14b is continuously updated by the computer 23 based on data recieved from the interactive input system 10. Computer 9 communicates changes to the world model 14 via digital data link interconnected to computer 23. Audio means 23 includes processing means and software means for the generation of 3-D audio output in response to changes and actions of subjects modeled in the computer generated model 14a. The output audio signals are transmitted to speakers positioned about the participant by way of the panoramic audio-visual assembly means 4.

The preferred embodiment of the system 1 may generally comprise two alternative panoramic audio-visual assembly means 4: A headmounted display (HMD) assembly 11, or a large display assembly 12. The large display assembly 12 may incorporate conventional 31, stereographic 32, autostereographic 33, or holographic 34 display units. Specific processing means 18 compatible with a given display unit's 31, 32, 33, or 34 format operate on the virtual model 14a. The processing means 18 then outputs a signal representing a model segment 26a to a predetermined display unit 31, 32, 33 or 34. Display units 31, 32, 33, or 34 are placed contiguous to one another in a communicating relationship to the participant such that a continuous scene is presented to the participant. In this manner the same basic imagery, shape, and audio data is rendered into a model 14a that may be operated upon for presentation on conventional, stereographic, autostereoscopic, or holographic display systems.

The model 14 presented to the participant may be derived from prerecorded data stored in a mass storage device 25. Alternatively, live feeds from input sources 2 at a remote location are processed in near real time and the participant can interact with the remote location by using teleoperated devices. In these manners the viewer is immersed in a highly interactive and realistic computer simulation.

Still referring to FIG. 1, in operation a panoramic sensor array comprising a plurality of shape, visual, and aural sensors are positioned to record a three-dimensional subject in a substantially continuous panoramic fashion. Each sensor 27 outputs a corresponding signal specific to that sensors field of coverage. Signals representing visual and shape data are transmitted from input sources 6 and 7 to the signal processing means 3. A first computer processing means 15 fuses the shape and visual signals to form model segments 26a. The pool of model segments are then transmitted to a second processing means 16 that fuses or matches adjacent and corresponding model segments to one another. The matching of intersections of the pool of model segments yields a panoramic three-dimensional model 14a. Typically the model 14a is rendered such that three-dimensional subjects in the foreground are of high-resolution and three-dimensional subjects in the background of less resolution. Preferably, the background scene lies approximately ten feet beyond the boundary of the furthest distance the participant would venture into the virtual model. This is because beyond ten feet perspective is not significantly perceptable to the average human. And beyond this viewing distance the background scene of the model 14a would not need to be rendered in a 3-D manner because the viewer can not perceive parrallax and hence the the realism is not increased. A third processing means 17 receives the fused model of panoramic coverage. The third means manipulates the geometry of the model 14a based on viewer interaction. A forth processing means 18 samples out portions of the model and transmits signals representing scenes 71 of a given field of view to predetermined display units of the display assembly 11 or 12. The dimensions and detail of the virtual model 14 may be increased by moving the sensors to different locations throughout the real world environment in order to increase the resolution of the recorded subjects and to increase the pool of perspective views of subjects throughout the recorded environment. These sensor recordings are then processed and added to the existing data base and existing model in the same manner as prior subjects modeled for inclusion in the computer generated environment. Simultaneous with visual input, processing, and display, audio sensors 30 (FIG. 5) transmit audio signals to an audio processing system 23. The audio processing system is operated to assign audio signals to visual subjects positioned and comprising the panoramic computer generated model.

An interactive input system 10, such as a position sensing system, monitors the viewers head position. Position data is transmitted to the visual and audio simulation processing system 17 and 23 respectively. The position and orientation data from system 10 is processed by the visual and audio simulation processing means to update the model 14 after each of the participants actions. Updating the model typically involves the participant moving a virtual object in the model with his hand, or changing the viewpoint of the displayed scene based upon a change in the participants head position. Positional changes of objects, subjects, and scenes are continuously updated and stored in the memory of the computer 9.

Imagery and audio signals are transmitted from the visual 15–18 and audio 23 processing means to the audio-visual assembly means 11 or 12. The processing means has appropriate output processors, conductors, and interface connections to transmit the visual and audio signals to the visual display units 31, 32, 33, or 34 and audio speakers 35 of the display assemblies 11 or 12. The visual model 14a and aural model 14b are updated and displayed instantaneously before the viewers eyes.

INPUT MEANS

Figure 2:
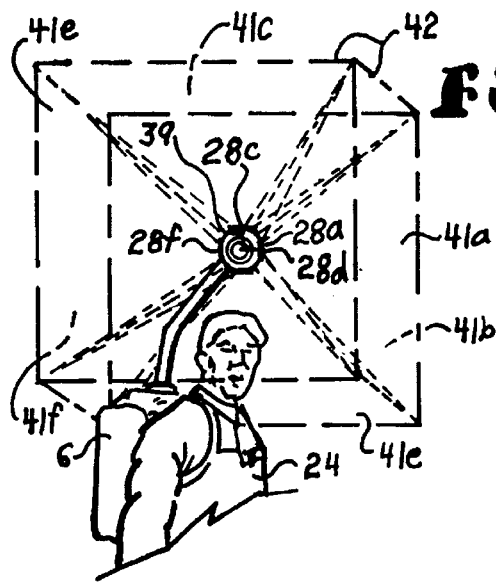
FIG. 2 is a perspective view of a cameraman carrying a panoramic camcorder system of spherical coverage described in prior art.
Figure 3:
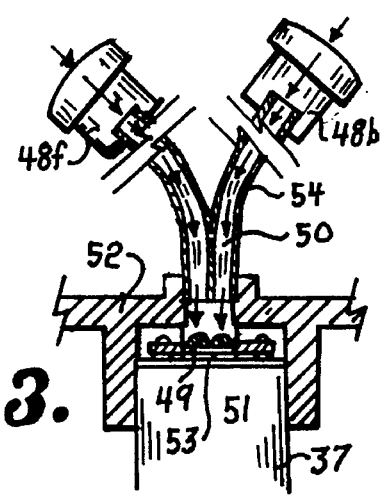
FIG. 3 is a greatly enlarged fragmentary sectional view of one of the camera arrangements for optically recording image segments representing sides of a three-dimensional subject into a single frame according to the present invention.

Referring to FIG. 1 in more detail, input means comprises a 3-D camera system 6, 3-D digitizing system 7, and 3-D audio system 8. Preferrably, at least one image sensor 28 of each image system, at least one shape sensor 29 of each 3-D digitizing system, and at least one accoustical sensor 30 of at least one audio system are positioned adjacent to one another and record a continuous corresponding segment of the subject 13. FIG. 2 illustrates a panoramic camera system 1 of prior art in which a plurality of image sensors 28a–28f and audio sensors (not shown) are faced outward about a point or area to record a contiguous surrounding visual subject scene 13c. FIG. 3 illustrates a panoramic camera system in which image sensors 28a–28f are positionable and may be faced inward to record representations of each side of a subject 13.

Figure 4:
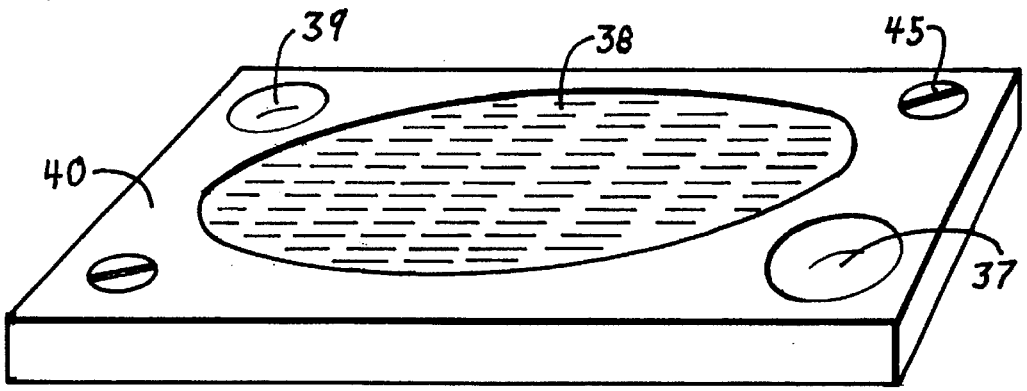
FIG. 4 is a perspective view of a sensor array for recording accoustical, visual, and shape data for input according to the present invention.
Figure 5:
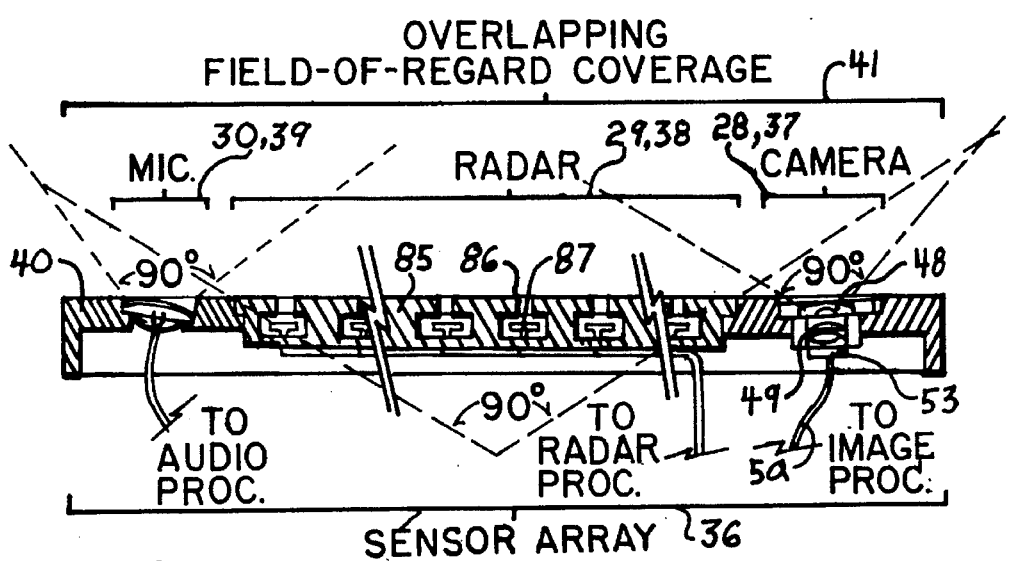
FIG. 5 is a side sectional view of the sensor array shown in FIG. 4.
Figure 6:
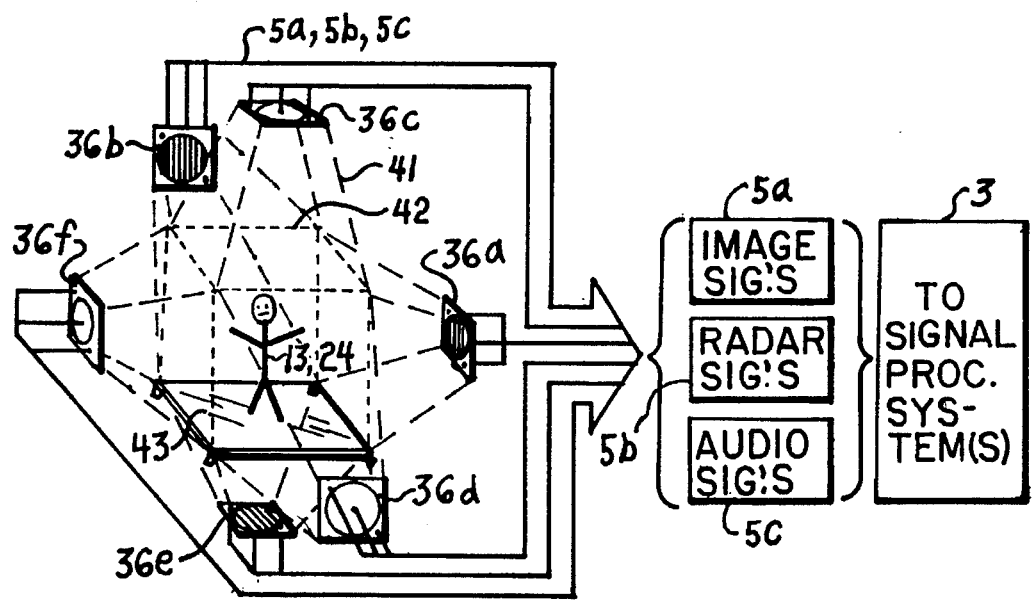
FIG. 6 is a diagrammatic representation of an inward looking three-dimensional input source incorporating the sensor array shown in FIGS. 4 and 5.

FIG. 4 and 5 illustrates a sensor array 36 including a visual system comprising a small conventional camera 37, a 3-D digitizing system comprising a small conventional radar 38, and an accoustical system including a microphone 39. The microphone, radar, and camera of each array have overlapping field-of-regard coverage 41. The overlapping coverage enables each the arrays sensors to record an accoustical, shape, and image signature of a given side of a subject 13. FIG. 6 illustrates a plurality of arrays 36a–36f faced inward about a 3-D subject. Each array has adjacent field-of-regard coverage 42 of the subject such that each side of the 3-D subject is recorded. Accoustical, shape, and image signatures from each of the arrays are transmitted to signal processing means 2.

Figure 7:
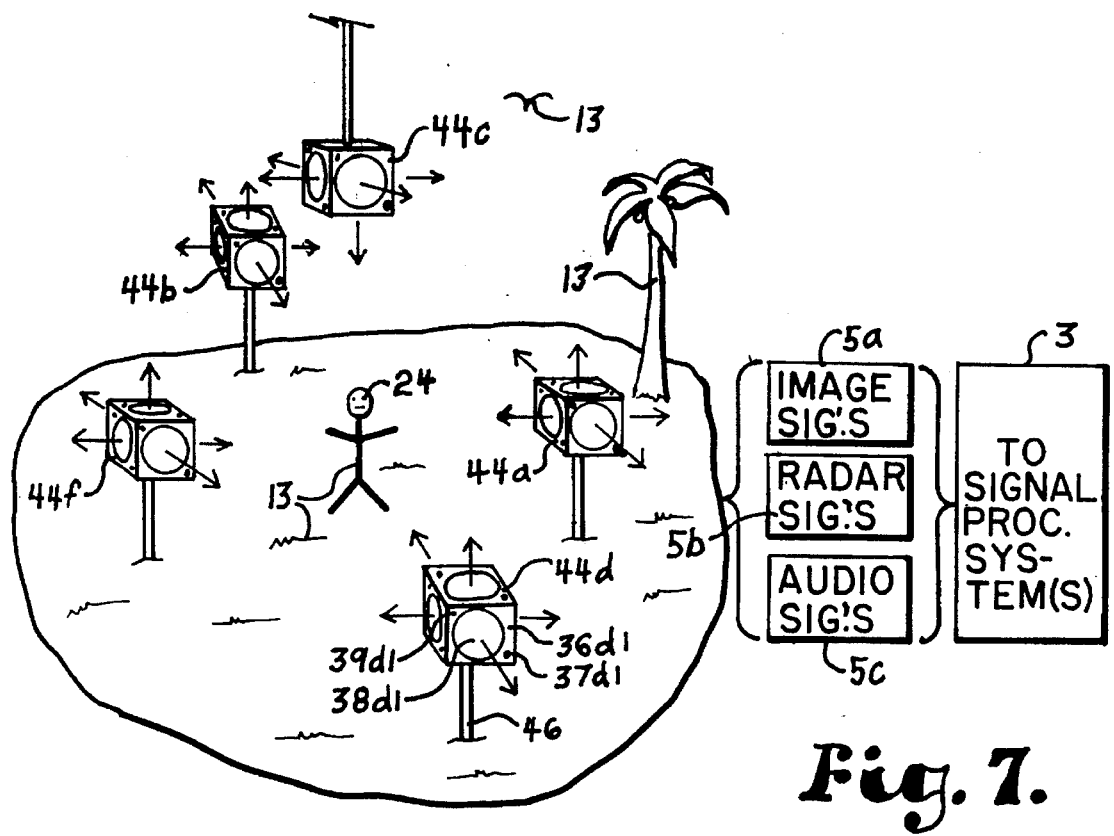
FIG. 7 is a diagrammatic representation of a inward and outward looking panoramic three-dimensional input source assembly incorporating the sensor array shown in FIGS. 6 and 7.

FIG. 7 illustrates sensor arrays which may be faced both inward and outward to record a subject. Arrays are positioned adjacent to one another to form a panoramic array assembly 44. Sensors of the adjacent arrays 36a–36f of the assembly are positioned to have adjacent field-of-regard coverage 42. The array assembly has a substantially panoramic 3-D spherical field-of-regard coverage about a point. A plurality of array assemblies 44a–44f may be arranged in the real world to simultaneously record a subject 13 environment from various points-of-regard. In this manner, virtually all sides of a subject surrounded by the array assemblies are recorded and background scenes surrounding the subject are also simultaneously recorded. Alternatively, a single assembly 44 may be moved thru space in the real world and records a subject 13 environment from various points of regard at different times. The array 36 or array assembly 44 may be constructed in a portable fashion such that the array or array assembly is carried through a real world environment by a living being or vehicle. Each array of the assembly transmits its respective accoustic, shape, and imagery signatures to the processing means 3. Processing means operates on the signature data to render the virtual world model 14. Array 36 and array assembly 44 may be fastened together and supported by conventional means such as screws 45 and support armature 46. Furthermore, sensors may be distributed over a vehicle such that the inner or outer skin of the vehicle becomes a housing for the sensors. The sensors can be placed on remote or host, piloted or unpiloted vehicles.

1) THREE-DIMENSIONAL PANORAMIC SHAPE INPUT

Figure 13:
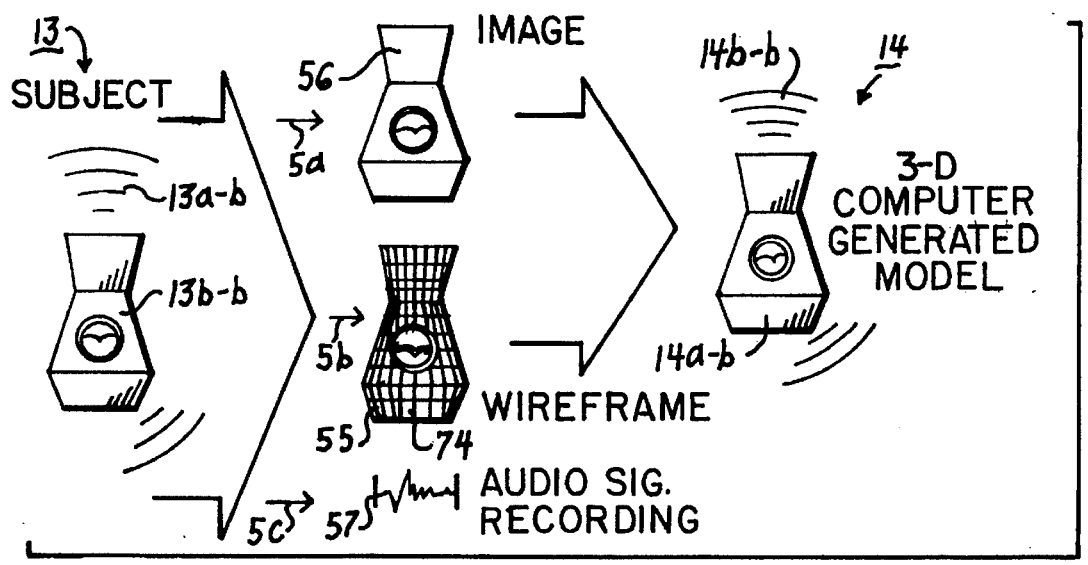
FIG. 13 is a diagramatic illustration showing how imagery is texture mapped onto a three-dimensional wireframe model to form a three-dimensional virtual model generated and processed for presentation by audio and video computer signal processing means of system 1.

A panoramic 3-D digitizing system 7 comprises one type of input source 2 and is operated to input 3-D data representing a subject 13. The system 7 is operated to record the shape of a 3-D subject. System 7 may comprise a 3-D light pen, optical scanner, image recognition system, sonar, ultrasonic, laser scanner, radar, laser radar (LADAR) system or systems. Additionally, mathematical formula defining the shape of the subject may be entered by an operator via a keyboard. The 3-D data is transmitted from the system 7 to a computer processing system 9 where it is operated upon. As shown in FIG. 13, the resulting 3-D data representing the subject is called a wireframe 55. The wireframe is a 3-D line and point computer generated rendering of a subject. The intersection of the lines form polygons that define the surfaces of the subject. A 3-D shape input system including a stylus and model table arrangement of the type described in U.S. Pat. No. 4,514,818 by Walker available from Quantel Limited, UK, or the 3SPACE TM Digitizer available from Polhemus of Colchester, Vt. may provide the shape data in system 1. Alternatively, a three-dimensional input system of a type described in U.S. Pat. Nos. 4,737,032 and 4,705,401 by Addleman and available from Cyberware Labratory, Inc. as the Rapid 3D Color Digitizer Model 3030 and associated products may provide the shape data in system 1. The Cyberware digitizer incorporates sensing and illumination elements to record a three-dimensional subjects shape and color. Seconds later, a graphics workstation displays the object as a detailed, full color, three-dimensional model. Alternatively, a radar and camera system decribed in U.S. Pat. No. 5,005,147 by Krishen et. al. may be incorporated to provide shape and imagery data in system 1. Still alternatively, a laser-radar(LADAR) system, including a video camera, available from Autonomous Technologies Corp. of Orlando, Fla., may be incorporated to provide shape and imagery data in the system 1.

2) THREE-DIMENSIONAL PANORAMIC CAMERA INPUT

Preferrably, a 3-D camera system f comprises a plurality of objective lenses typically faced inward about a being or object, and outward to record a scene. Preferrably the objective lenses 48a–48f of the camera have overlapping or adjacent field of view coverage. Any conventional TV camera or non-standard camera may be utilized in the present system 1 that is compatable with signal processing means 3. The electrical section of the camera is structured to convert the visual images recieved by the image processor into electrical video signals 5a such that the information is in a format that is compatible with standard video processing equipment. Any conventional or unconventional video camera 37 may be adapted to accept the images from the disclosed optical systems in FIG. 1 thru FIG. 7. The image processor of the camera is structured to convert the visual images received into electrical video signals. Preferrably, the processed camera signals are typically standard synchronized coded signals utilized in the United States for video transmission. The signal processor 3 may be modified to convert each received electrical video signal 5a from the image processor means into a standard or non-standard synchronized coded signal of any given country or format for transmission and processing as desired, such as NTSC, PAL, SECAM, IDTV, HDTV, or the like.

In both the spherical field of view optical assembly of FIG. 2, and the positionable field of view camera arrangment of FIG. 3, images may be combined by either electronic means or by optical means. Similarly, image chrominance, luminance, hue, and intensity may be controlled electronically, optically, or electro-optically by the camera or later by the signal processing means. Typically, when a plurality of cameras 6a–6f are incorporated, the plurality of images are compressed into a single frame by processing means 2. When a single camera 6 is incorporated, the images are optically integrated into a single frame.

Any of these arrangements may be incorporated with array 36, or array assembly 44 of the system 1.

Although simple optical systems are depicted in FIGS. 2–7, it should be clear to one skilled in the art that more complex optical arrangements can be employed. Other optical elements and electro-optical components that may be included are automatic shutters, automatic focusing devices, optical filters and coatings, image intensifiers, correcting and inverting lenses, lens adapters, sensitive recording surfaces and media of various types and formats, wavelengths, and resolutions, and so forth and so on. These various optical arrangements are given the designer to accomplish a given task. Standard video compression devices can be incorporated into the camera to compress the signal to aid in the storage, transmission, and processing of each image. Image sensors associated with moving target indicators (MTI), pattern recognition systems, and so forth, may be integrated with the optical systems of system 1. Conventional over-the-air video transmitters can be incorporated to transmit each image to a remote video receiver for processing and display.

Figure 8A:
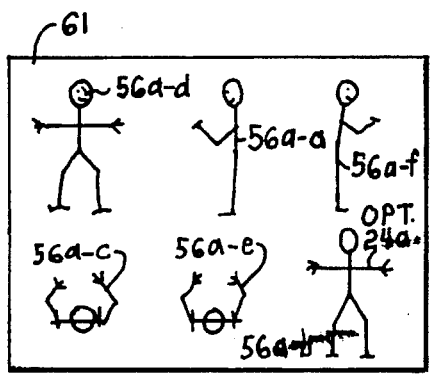
FIGS. 8A–8D are diagramatic representations of video frames of three-dimensional coverage of beings and objects to be modeled in 3-D in the present invention.
Figure 8B:
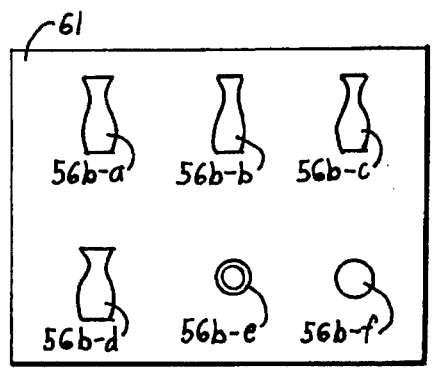
Figure 8C:
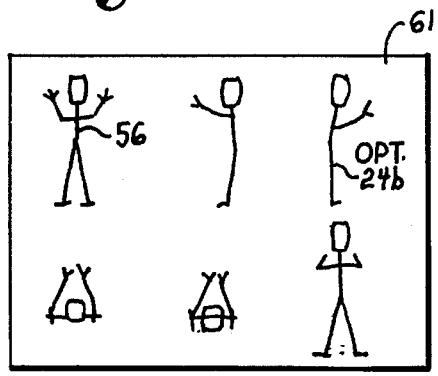
Figure 8D:
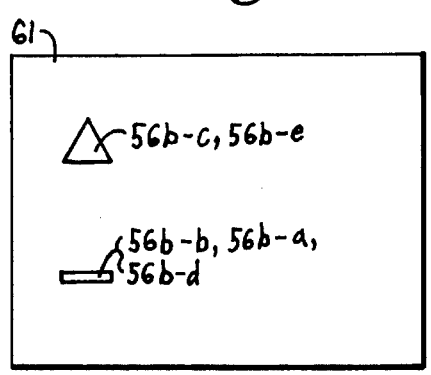
Figure 9A:
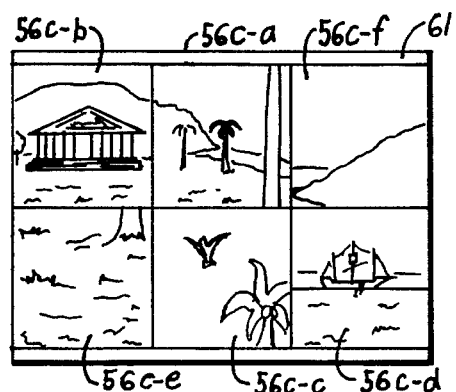
FIGS. 9A–9B are diagramatic representations of video frames of three dimensional coverage of beings, objects, and background scenes, respectively, to be modeled in 3-D in the present invention.
Figure 9B:
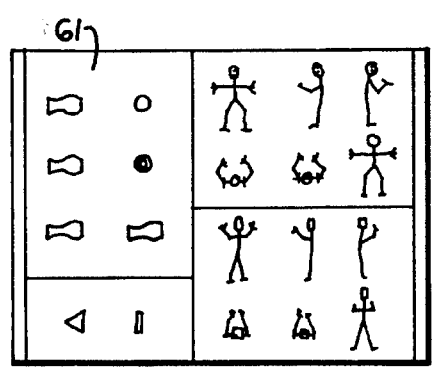
Figure 10:
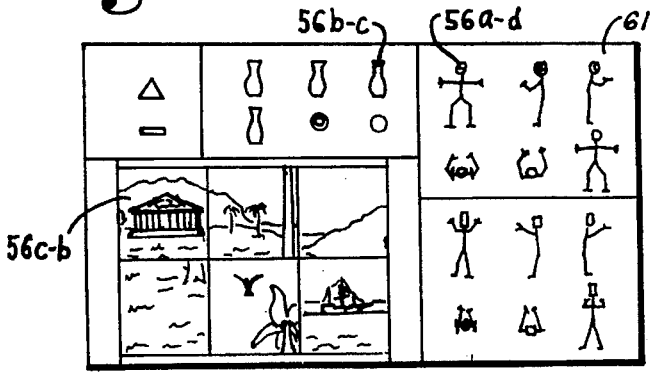
FIG. 10 is a diagramatic representation of a HDTV frame on which includes both foreground and background imagery necessary to model a virtual environment.

FIG. 2 illustrates a prior art camera used for recording a scene of spherical field of view coverage. A type of spherical camera utilized is generally of the type described in U.S. Pat. No. 5,130,794 by the present inventor. As shown in FIG. 9A, in this way a spherical field of view scene about a point is recorded on a single frame. FIG. 3 illustrates a positionable 3-D camera system for recording all sides of subjects to be modeled in the computer generated virtual environment. Images are transmitted from the objective lenses, thru fiber optic image conduits in focus to a light receiving surface 49 of a camera 37. As shown in FIGS. 8a thru 10, in this way all sides of a subject or subjects are recorded in single frame 61. Typically, optical elements, as shown in FIG. 3, are arranged to record images of various sides of the subject into a single frame. Optical elements such as mirrors, prisms, or coherent fiber-optic image conduits transmit images from one or more objective lenses to the light sensitve recording surface of the camera or cameras. The optical fiber bundles are of a type that allows them to be twisted in route such that the desired image orientation at the exit end of the bundles is facilitated. Image bundlies have a rectangular cross section to facilitate the format of the image with the cameras format. Cross sectional resolution of 60 to 100 fibers per millimeter and low light loss transmission construction are incorporated to maintain image quality. Optical fibers are gathered at their exit end such that the image fibers optical axes are parallel to one another and perpendicular to the light sensitive recording surface of the camera. The image focused on the exit end of the conduit is optically transmitted in focus to the light sensitive surface of the camera. FIG. 9b is a frame in which a plurality of subjects whose sides have been recorded by a camera of a type generally illustrated in FIG. 3. Alternatively, FIG. 10 shows that imagery of all beings, objects, and background scenery comprising model 14a may be combined in a single frame. Preferrably, a high resolution sensor, such as a HDTV or IDTV recording system, is incorporated. High resolution recording allows for images to be enlarged for later viewing and still retain acceptable detail.

Alternatively, as shown in FIG. 5, the panoramic camera system may comprise a plurality of cameras. When a plurality of cameras are incorporated, images are recorded by positioning a plurality of image sensors toward and about a subject such that substantially continuous coverage is achieved by the sensors. Typically, conventional charge coupled devices (CCD) 53 are positioned directly behind objective lenses or fiber optic image conduits to record image segments of beings, objects, and scenes. Alternatively, image conduits 50 may be routed to a plurality of cameras. The images are then transmitted to television production equipment, or computer 9 over a conductor for processing. U.S. Pat. No. 5,130,794 by the present inventor and U.S. Pat. No. 5,023,725 by McCutcheon disclose optical and electronic methods and means of recording and compressing a plurality of images into a single frame generally applicable to incorporation in the present invention 1. Alternatively, instead of spatially compressing or spatially multiplexing a plurality of images into a single frame, images may also be time multiplexed. In such an arrangement, alternating images are electronically sampled into a single channel. The images are later demultiplexed by a video demultiplexer device and processed by the computer 9. A video multiplexer/demultiplexer system of a type generally incorporated into the present system 1 is available from Colorado Video Inc. as the Video Multiplexer 496A/B and the Video Demultiplexer 497A/B. While digital compression, spatial compression, or spatial multiplexing the images is not required, it will be appreciated by those skilled in the art that compressing the image in one of these manners greatly assists in the transmission, processing, and storage of the vast amount of imagery necessary to build a panoramic model.

3) THREE-DIMENSIONAL AUDIO INPUT

The 3-D audio input system 8 preferably is in communicating relationship with a high speed digital audio signal computer processing system 23 that delivers high quality three dimensional sound over conventional headphones. In FIG. 2 microphones 39a–39f (not shown) are distributed to face outward from the lens housing to record a spherical accoustical field of regard coverage about a location. In FIG. 3 microphones 39a–39f (not shown) are faced inward about a subject to record a contiguous accoustical field of regard coverage emanating from the subject 13. As illustrated in FIG. 4 and 5, microphones may be integrated with the array 36. The microphone 39 of each array preferably has audio coverage 41 corresponding to the shape and optical sensor coverage 41 of the same array. FIG. 6 and 7 show that arrays may be placed beside one another to achieve continuous adjacent panoramic audio coverage 42 of a subject. Audio signals 5c from audio input sources 8 are transmitted to the computer 23. The computer 23 may consist of a conventional personal computer or computer workstation 9 and includes printed circuit boards designed to sample the input audio signals 5c. Types of workstations and associated printed circuit boards generally utilized for 3-D audio input, processing, and output are manufactured by Division Inc. of Redwood City, Calif. as the Accoustetron complete studio quality audio workstation and the Convolvotron and Beachtron audio processor printed circuit boards. The audio system 23 uses the virtual 3-D audio client/server protocol standard (VAP) as an operating system software interface with audio input devices such as compact disc or magnetic tape machines, and for communicating with means 17 of computer 9. The boards occupy ISA-compatable personnal computer slots. Input accoustical data from audio input source 8a–8f are typically stored on digital or analog sources such as compact disc or magnetic tape machines, or may be digitized and stored in computer memory 25b and referenced to beings, objects, and scenes that form the visual model 14a comprising the computer generated environment 14.

The computer 23 samples and affects recorded audio data comprising the audio model 14b based on control data including audio sources position and orientation, participant position and orientation, environment reflection and transmission attributes, and audio source and participant velocities in the virtual environment 14. The host computer processing means 17 is programmed with software such that control data is automatically transmitted over a standard RS-232C output of means 17 to audio means 23. Control data is operated upon by computer 23 as a local geometric transform and HRTF tables and gains and input into a high speed digital audio signal processing system (e.g. Convolvotron or Beachtron) printed circuit boards. The input data is operated upon by the board level system of means 23 to affect input audio sources corresponding to each board level system. Input audio sources 8 are converted from an analog to digital audio signal 5c. The board level system then outputs the affected audio to a digital to analog converter. The audio system 23 outputs two independent 16-bit digital/ analog converters synchronized to the analog to digital converters driving conventional stereo output. The audio is typically transmitted over conductors to the stereo headphones on the participants 24 head. In this manner the perceived locations of sound sources in the environment can remain independent of the orientation of the user.

Alternatively, audio computer 23 may comprise a personal computer or workstation that access analog or digitally recorded sound data that is input or stored directly in computer 23 or stored on disk, digital-audio tape, or compact disc. Computer 23 uses the Musical Instrument Digital Interface (MIDI) audio system to program, process, and output MIDI formatted data streams which in turn are interpreted by MIDI devices such as synthesizers, drum machines, and sequencers distributed across the MIDI network. The system outputs a stereo signal to the participant 24 which typically wears stereo headphones 64. The audio system 23 may be of a type generally available from Silicon Graphics Inc., Calif. as the IRIS Indigo or Personal IRIS 4D/35 workstation, which includes a DAT-quality digital-audio subsystem, and configured with Audio Library software; and available from VPL Research Inc. CA as the AudioSphere TM system for use with computer generated virtual environments. Optionally, the MIDI audio system may be designed integral to computer 9 (e.g. available on all 1993 and future Silicon Graphics Inc. platforms).

Alternatively, the stereo audio signals 5c can be transmitted over-the-air to a reciever 63 (FIG. 17) on the headphones 64 by an infrared or radio frequency device. An over-the-air audio system of a type generally incorporated into the present system is available from Radio Shack Inc. as the Wireless FM Microphone with transceiver and the Radio Shack Inc. Stereo FM Radio Headset. The transceiver 62 transmits over-the-air stereo radio signals output by the computer system 23 tunable between 88–108 GHz to the receiver 63 of the an FM radio with stereo audio headphones 64 worn by the participant.

Alternatively, the audio signals 5c from audio input sources can be transmitted by conductors directly to speakers 35 (FIG. 18) distributed around the participant. The speakers are supported by the structure 65 of the large display assembly in a manner consistent with U.S. Pat. No. 5,130,794 by the present inventor or that described in U.S. Pat. No. 4,868,682 by Shimizu et al.

4) GRAPHIC COMPUTER AS INPUT SOURCE

Still alternatively a graphics computer 19 is operated as an input source 2 (not shown) to create a 3-D world model 14a. The computer system includes a digital computer including a central processing unit, memory, communications ports, and the like. Operating system software, graphics software, processing data, generated images and the like are stored in mass storage devices which may include magnetic disk drives, optical disk drives, and so forth. Commands to operate the computer system and graphics generation commands are entered by means of the viewer interaction devices which may include a keyboard and graphics input device. The graphics input device 66 may consist of one or more of a joystick, a trackball, a "mouse", a digitizer pad, a position sensing or pointing system, a non-contact viewer position and recognition sensing system, a voice recognition system, or other such devices. The graphic input device 66 may be operated as an input source 2 or as part of the participants interactive input system 10. The computer graphics system 19 includes a bit mapped video display generator wherein each pixel element or pixel is accessible for generating high resolution images. The video display generator is connected to an input port by suitable conductor lines. The computer generated images are then further processed by the signal processing means 3 for display. The digital computer may be any type of computer system which has the required processing power and speed such as the type which are employed in 3-D computer graphic animation and paint applications. The computer system may function as a simulator controller if the display means of the present invention are used as simulators or as a game controller if the systems are employed as arcade games. The computer system may also be used to create special visual effects by combining artificial and animated scenes with live camera recorded scenes.

Figure 11:
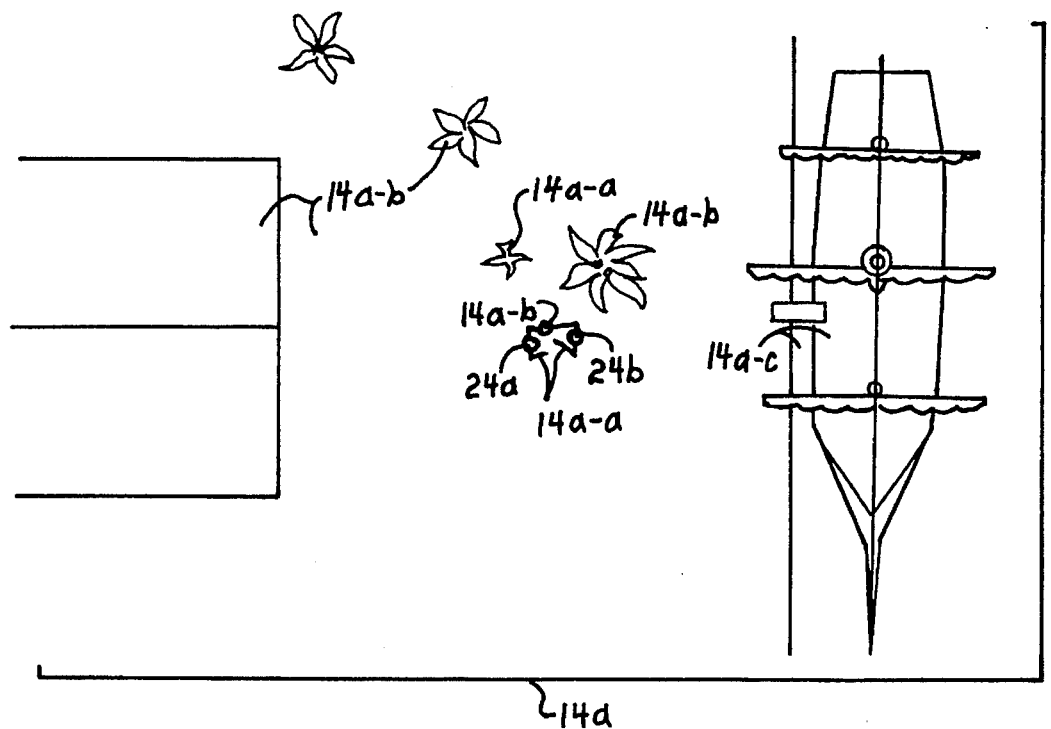
FIG. 11 is a fragmentary diagrammatic view onto the top of the virtual world model in which recorded three-dimensional beings, objects, and/or scenes are Incorporated according to the present invention.
Figure 12:
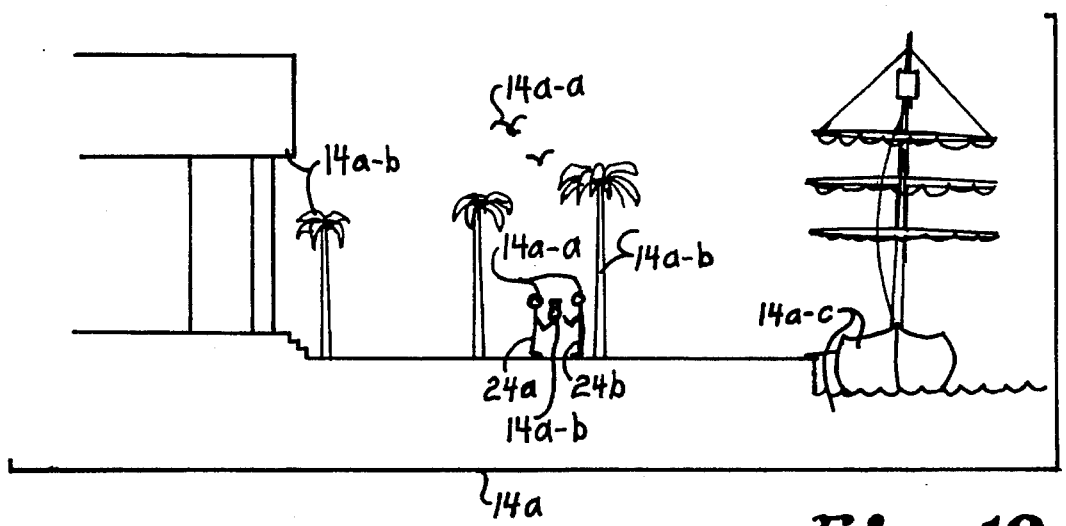
FIG. 12 is a fragmentary diagrammatic view onto the side of the virtual model shown in FIG. 11.

A graphics computer system of a type utilized herein is generally of the type manufactured by USA Quantel Inc., Stamford, Conn. as the Quantel Graphics "Paintbox" TM System, or by Alias Research Inc., Toronto, Ontario, Canada as Alias PowerAnimator TM animation software for operation on Silicon Graphics Inc. workstations. It is forseen that the graphics computer system 19 and image processing system 17 may occupy the same computer 9. Additionally, conventional videotape 67 and videodisc 68 player's input signals 5c representing prerecorded image and audio signals may transmit images to the signal processing means 3. As illustrated in FIGS. 10 thru 12 each frame may consist of images of one, several, or all subjects to be modeled in the virtual environment. Likewise, a single, several, or all the audio tracks may be recorded onto a single recording medium.

Additionally, a computer mass storage 25 database may serve as an input source. In such an instance, shape, imagery, and audio information may be encoded onto tape, or a magnetic or optical diskette or platter in an all digital format.

PROCESSING MEANS

Figure 15:
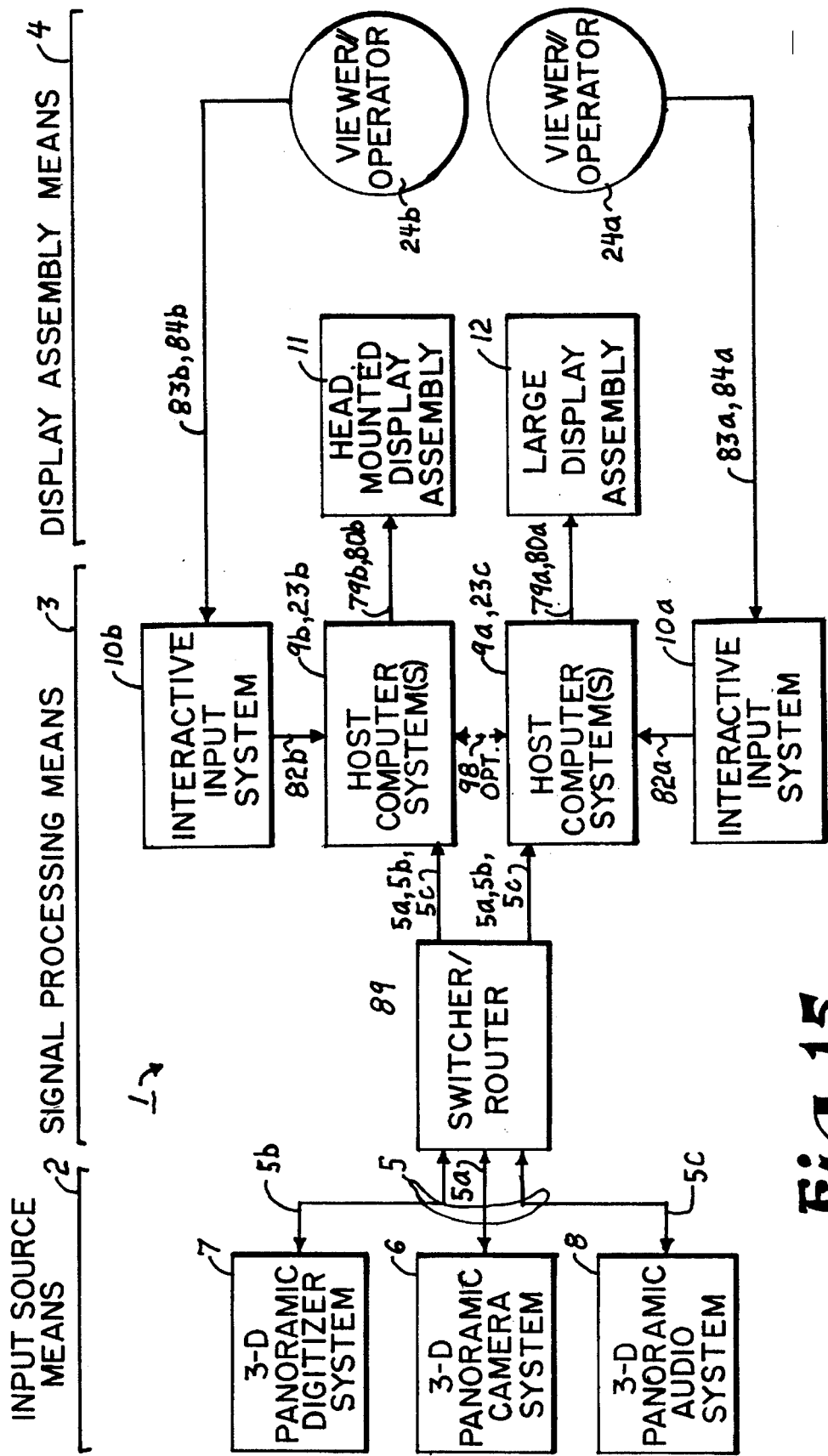
FIG. 15 is a block diagram of an image formatting system for recording, processing, and display of an image of three-dimensional coverage which embodies the present invention.
Figure 16:
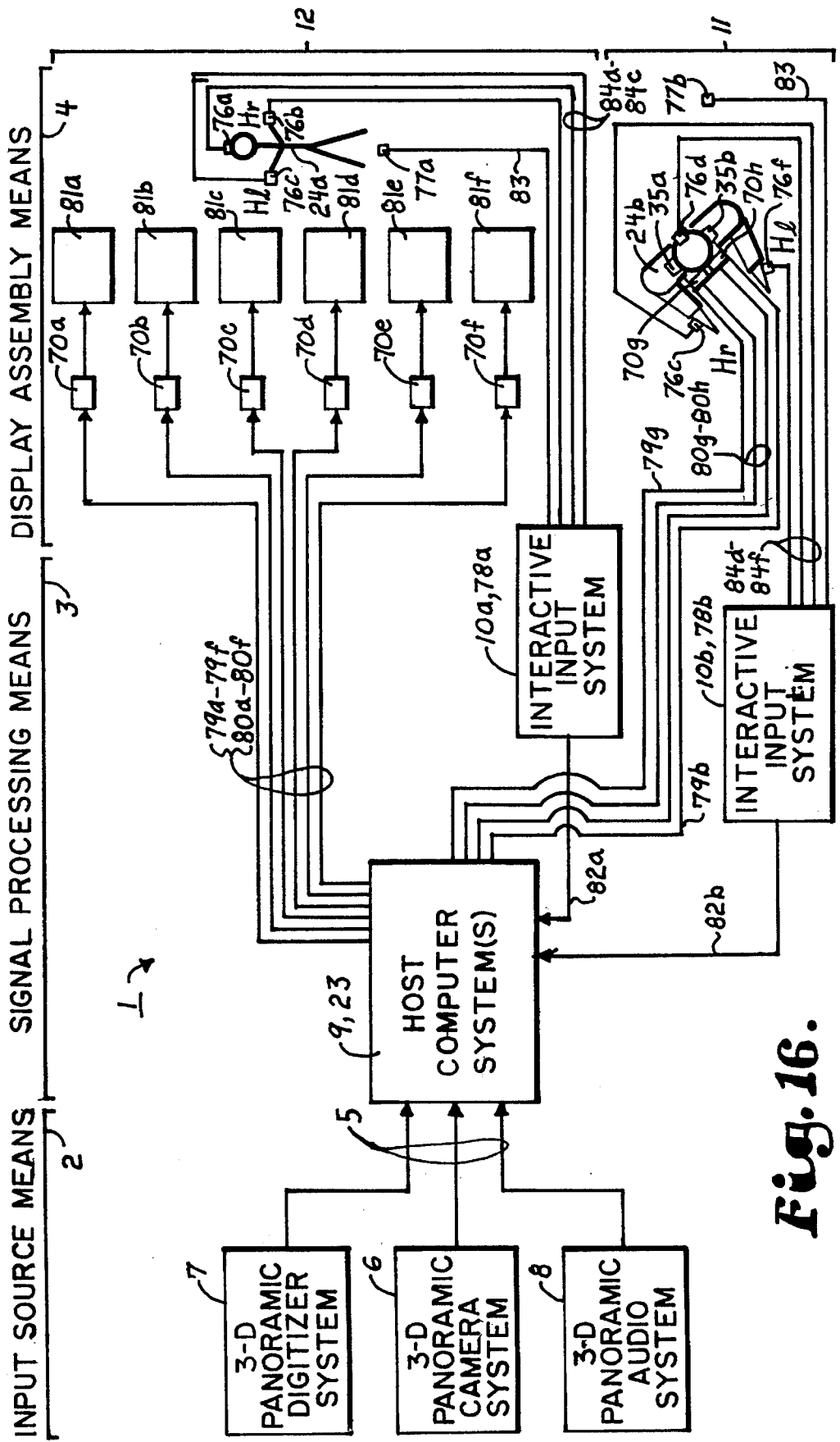
FIG. 16 is a block diagram of a second embodiment of system.

Processing means 3 of system 1 at least includes a host computer system 9 and interactive input system 10.
1) HOST COMPUTER Referring to FIG. 15 and 16, host computer 9 preferably comprises a digital computer system with high level image generation and graphics capabilities. A host computer 9 compatable with the present invention is generally of the type manufactured by Silicon Graphics of Mountain View, Calif. as the SkyWriter TM computer system.

The high level 3-D image generation and 3-D graphics capabilities of computer system 9 typically consists of a type of digital computer subsystem which has the capability to texture-map at least one NTSC video feed onto a three-dimensional wireframe 55 (FIG. 13). The host computer 9 may include single or dual pipeline subsystem configurations. The computer 9 may include all signal processing means 2 comprising means 15, 16, 17, 18, 19, 10 and 23. The high level image generation subsystem generally includes processing means 17 for manipulation of the geometric model 14, and processing means 18 for output of designated portions of the processed model 14 for display. Computer 9 includes a digital computer including at least one central processing unit, system bus, memory, communications ports, and the like. Computer 9 may be configured to drive one to twelve analog or digital output channels. Operating system software processing data, generated images, and the like are stored in mass storage devices which may include magnetic disk drives, optical disk drives, and so forth. Commands to operate the computer system 9 are entered by means of the participant interaction devices 10. The computer 9 may be configured to receive a single or plurality of inputs from a single or plurality of interactive input devices associated with the system 10 via host 9 communication ports. High-level 3-D image generation and 3-D graphics capabilities integrated with host computer 9 are generally of a type described in U.S. Pat. No. 4,827,445 by Fuchs; or manufactured by Silicon Graphics Inc., Mountain View, Calif. as RealityEngine TM Host Integrated Computer Image Generation System with VideoLab TM or VideoLab/2 TM input/output option, and with VideoSplitter/2 TM option. Skywriter TM with RealityEngine TM incorporates the IRIS Performer TM software environment to provide the performance and functional requirements for image generation applications.

The signal 5a is typically captured from an image input system 6 by a conventional frame grabber at preferably 30 frames per second and converted from an analog to digital signal by a conventional analog to digital converter 69. Alternatively, the computer may receive and operate on a multiplexed or compressed video signal. The converted analog signal representing the image is then transmitted to the computer 9 for texture mapping on a 3-D wireframe 55 representation defined in the host computer. Areas on the two dimensional frame 61 are referenced by look-up tables stored in memory of the computer 9. Pixels on the two dimensional frame 61 are assigned three-dimensional coordinates corresponding to a predefined wireframe model 55 stored in computer memory 25a. The image segments are manipulated by the computer to generate the effect to the participant that he or she is within the computer generated environment. To accomplish this effect in the HMD assembly or large display assembly, the computer performs programmed mathematical operations on the input imagery.

A mass storage device 25 may be a separate conventional magnetic disk device or can be an integral part of the host graphics computer 9, i.e., the main memory of computer 9. The mass storage device is used to store data representing beings, objects, and scenes representing subjects 13 in the world model 14. The mass storage device contains a previouly generated data base comprising a digital representation of the world model. FIGS. 11 and 12 illustrate a top plan and side view, respectively, that can be termed the world model 14 or simulated environment constructed to illustrate the present invention. The subjects rendered in the model 14a are nominally divided into a plurality of convex polygonal surfaces 74 (FIG. 13) having arbitrary numbers of sides. The respective polygons are represented in the data base as a sequence of data words each corresponding to a vertex of the polygon. By conversion, the vertices of the polygon are sequenced in, for example, a counter-clockwise direction within the data group. A one bit flag in a corresponding data word is utilized to indicate the last vertex. Each vertex data word suitably comprises a plurality of fields representing the coordinates of the vertex in a choosen coordinate system (x, y, z), the intrinsic color intensities present at the vertex (R, G, B), and a vector indicating the unit normal to the polygon surface at the vertex. In this manner the intensity and depth value of each pixel comprising an object is stored in computer memory.

Alternatively, a single or plurality of live video feeds may be transmitted to computer 9 and processed in near real time. In such an instance, look up tables instruct the computer to sample predetermined portions of the image and texture map them onto predetermined portions of the 3-D wireframe model defined in the computer. Video compression systems and video multiplexer/demultiplexer systems may be operated to facilitate the reading in of images from a plurality of video sources. Or alternatively, a television production unit with image compression functions may be used to compress a plurality of sources into a single frame. A production system of a type and function compatible with the present system is described in U.S. Pat. No. 5,130,794 by the present inventor. The preassigned area on the model 55 on which the image segment is positioned and oriented for texture mapping may be stationary or have motion. The model may correspond to a persons head or body or an object in the real world. In such an instance, the being or object is tracked by positions sensors located on the real object. In this manner the computer can keep track of the position and orientation of the corresponding model in the computer 9 and texture map each pixel image in its proper position on the model of the object or being. The ability to sample a live video feed is a requirement in telepresence applications of system 1. Real-time texture mapping from a live video feed is especially useful in an image based virtual teleconferencing system like that described in FIG. 20 and FIG. 21. A television production system that can function as host computer 9 in system 1 especially designed for creating the effect of texture mapping live video on a 3-D shape is generally of a typed cited in U.S. Pat. No. 4,951,040 by McNeil et al., U.S. Pat. No. 4,334,245 by Michael, and U.S. Pat. No. 4,360,831 by Kellar and corresponding products of a type generally available from Quantel Inc. of Darien, Conn. as the Digital Production Center with MIRAGE TM or ENCORE TM, a 3-D image processing system.

It will also be appreciated that only one participant may be receiving images from computer 9. And that either a singular or plurality of HMD's assemblies 11 or large display assemblies 12 may be incorporated or interconnected. Or additionally, participants may use plural computers (9a to the nth) to operate on the same environment; e.g. telecommunications. In such an instance, only position and orientation data would be transmitted to a remote site to update the virtual model 14 of the remote computer 9. Viewers may interact with one anothers virtual model instead of or as well as with virtual models generated by the computer 9.

As shown in FIG. 1, preferably an integrated part of the host computer 9 is a graphics computer system 19. The graphics computer system is in direct communicating relationship with the computer 9. The keyboard, touch tablet, and host computer 9 are operated to control the processors and memory and other devices which comprise the graphics computer system. Various input sources may be routed to the graphics computer system for rendering. Once the graphics computer system has been operated to create or affect an existing picture, the picture is stored in mass storage or bused as a picture signal to the host computer 9, image segment circuitry means, or directly to a display unit. The computer graphics system comprising a digital computer may be operated to create or affect the recorded video images either before or after the images have been texture-mapped onto a wireframe. Typically the participant 24 affects the video images frame by frame. Such a graphics system is used in the present invention to affect the images presented in either a 2-D or 3-D format. The data to be affected is derived from a video input source 6 or storage device 25. The components in a typical vector or raster electronic graphics system include a touch tablet, a computer, framestore, and a display.

As shown in FIG. 1, it is foreseen that the system 1 may include an expert system 22 labeled A. I. for artificial intelligence with a complementary data base. The expert system is in direct communicating relationship to computer 9. The expert system may be housed in a separate chassis and communicate thru conventional conductors and input/output ports with computer 9. Or alternatively, the expert system may be integral to computer 9. The knowledge in expert system is provided to respond to participant 24 requests or actions, and each request or action has a record including a plurality of parameters and values for those parameters. The expert system is provided to process the record of a specific request or action to answer or respond to that request or action, and the complementary database stores a plurality of records of requests or actions having known answers or responses, and any request from a participant 24 is preprocessed by searching the complementary database for a record identical to the record of the request or action. If an identical record is found, the known answer or response to the request having that identical record is given to the participant to answer his or her request; however if no identical record is found in the complementary database, the expert system is invoked to answer or respond to the request or action. Expert system of a type generally compatable with system 1 are described in U.S. Pat. No. 4,884,218 by Agnew et al. and U.S. Pat. No. 4,884,217 by Skeirik et al. Answers or responses transmitted from the expert system are interpreted by computer 9 such that the model 14 is updated. Additionally, responses transmitted from the expert system may be received by other peripheral devices 228 such as motion simulators, participant interactive tactile and force feedback devices, teleoperated vehicles, or any computer actuated device. Responses in the form of data are operated upon by the peripherial device to affect control surfaces, motors, and the like. In this manner subject beings modeled in the computer generated model may interact with subjects in the real world environment. A motion simulator of a type compatable with system 1 device 228 generally responsive to participant actions and exper system data output is manufactured by McFadden Systems, Inc. of Santa Fe Springs, Calif. as the Model 611A Motion System. A tactile and force feedback device that is generally of a type compatible with system 1 device 228 is available from VPL Research Inc. of Redwood, Calif. as the DataGlove TM models THX, TSK, and FBX TM's.

2) INTERACTIVE INPUT DEVICE SIGNAL PROCESSING

An important part of signal processing means 2 is the interactive input system 10 operated by actions of the participant 24 to manipulate the virtual beings, objects, and scenes within the virtual environment. Interactive input devices (e.g. data gloves with position, orientation, and flexion sensors, and HMD with position, orientation, and eye tracking sensors) are typically connected by RS-232 input/output ports or the like to processing means of computer 9.

Data from device sensors are typically translated to machine language compatible with software programming of the host computer by an interactive input systems'system electronics unit 78. The electronics unit 78 may be mounted adjacent to the device, a separate chassis, or in some configurations comprise a printed circuit board that is plugged into the system bus of computer 9. Alternatively, an interactive electronics unit 78 (FIG. 17) housing a single chassis may provide an interface between left and right data gloves, HMD, and voice recognition systems and computer 9. The electronics unit 78 receives signals from the sensors over conductive cable and translate the signals into machine language compatible with the host computer 9. The electronics unit 78 contains interface circuitry to translate the data. The translated signals are transmitted by the electronics unit to the computer 9 over suitable conductors. An electronics unit 78 arrangement for interfacing various interactive devices to a host computer 9 workstation in system 1 is of a type generally utilized by NASA Ames Research Center, Moffett Field, Calif., and operated as part of the Virtual Workstation and Virtual Visual Environment Display (VIVED) project.

The preferred embodiment of the system 1 generally comprises two display means: a headmounted display (HMD) assembly 11 and a large display assembly 12. Data from the input devices is operated upon by the processing means of computer 9 to affect the virtual environment. Interactive input systems 10 and associated devices compatable with the present system 1 include spaceballs, position sensor systems, pointing systems, datagloves, datasuites, voice recognition systems, and other such input devices. Electro-optical, ultrasonic, and magnetic position sensing systems for tracking an object or being are also known to those skilled in the art and may be incorporated with the present system 1. Position sensing systems worn by a viewer or mounted on an object of a type particulary compatible with and that may be incorporated into the present system 1 include those manufactured by Ascension Technology Corporation of Burlington, Vt. as A Flock of Birds TM,, and Polehemus of Colchester, Vt. as 3Ball TM, 3SPACE TM Tracker, and 3SPACE TM ISOTRAK TM. U.S. Pat. Nos. 4,542,291 and 4,988,981 by Zimmerman et al. describes an interactive input device and method compatible for incorporation with the present system 1. Products consistent with Zimmeran's invention are available from VPL Research Inc. of Redwood City, Calif., as the DataGlove TM, DataVest TM, and DataSuit TM product lines. Associated VPL software compatible with VPL interactive input system 10, including associated electronic units, interface circuitry, devices, and with computer 9 (e.g. Skywritter TM workstation with RealityEngine TM image generation subsystem) is provided for incorporation with system 1. The VPL input device 10 contain a microprocessor that manages the real time tasks of data acquisition and communication through the various RS232C, RS422, user port and optional IEEE 488 port. The microprocessor also controls a 3Space Isotrack TM position and orientation system incorporated in the control unit 10. Host computer 9 is programmed with software that allows a library of gestures, solid model simulations of complex objects, and the manipulation of said objects in real time.

Additionally, non-contact position sensor systems 97 (FIG. 18), such as electro-optical systems, described in U.S. Pat. No. 4,843,568 by Krueger et al., U.S. Pat. No. 4,956,794 by Zeevi et al. are compatible and may be incorporated with the present system 1. The radar in U.S. Pat. No. 5,005,147 by Krishen et al. and the LADAR available from Autonomous Technologies Corp. of Orlando, Fla. may also be positioned above the viewing space to sense the position and orientation of participants and objects in the viewing space 58 (FIG. 19). Data from the radar or LADAR is processed by suitable computer processing means to determine the position and orientation of the viewer in the viewing space.

The position data is then processed by computer 9 to affect the model 14 of system 1. Additionally, data from the same sensors that track the position and orientation of a target subject 13 (e.g. LADAR or radar system with a video camera) may be operated upon by computer 9 to reconstruct the subject as a model 14a. In such an instance input system 1 and position sensing system 10 constitute the same system. The combined system 1 and 10 is placed about the viewer as in FIG. 6.

Figure 17:
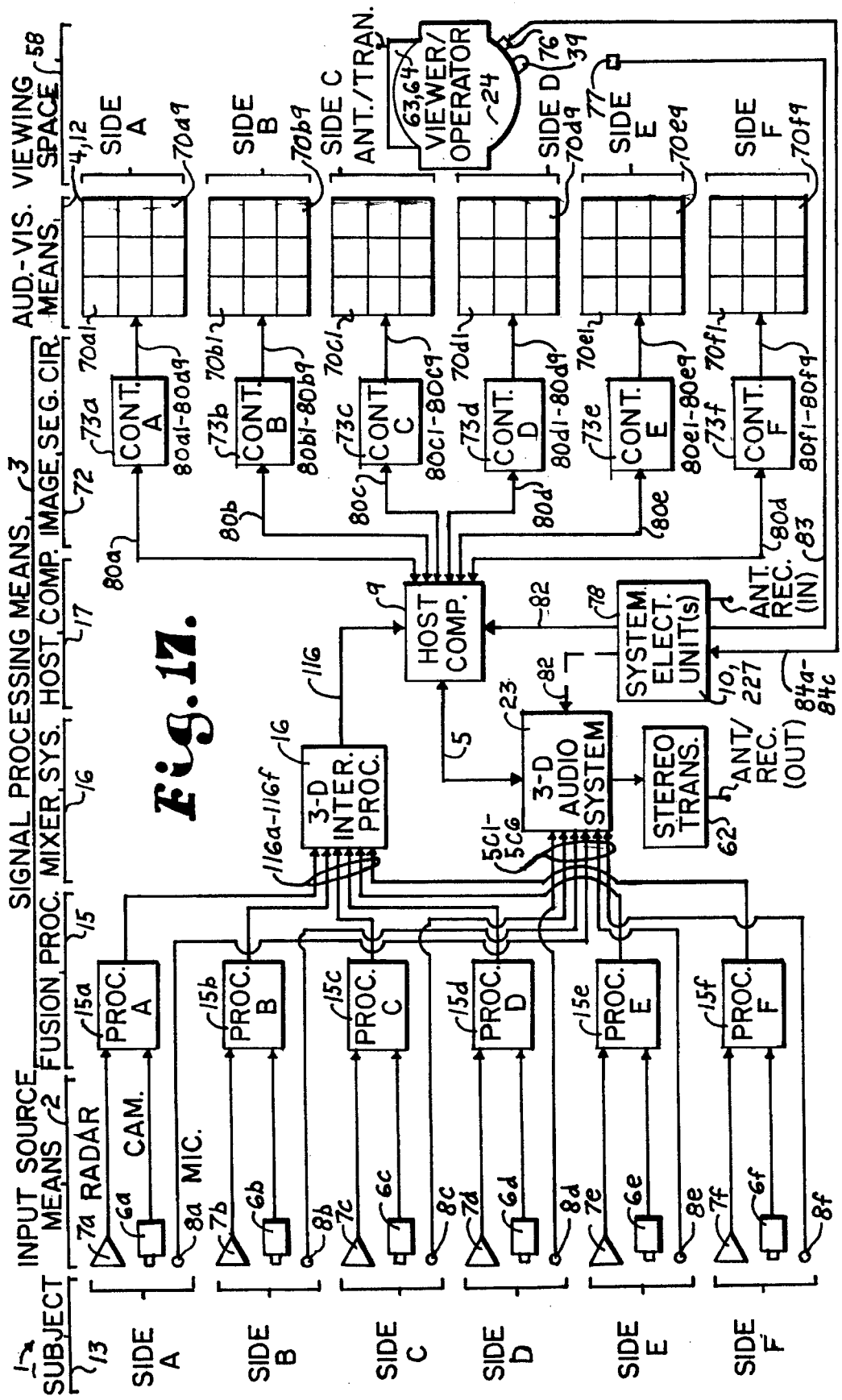
FIG. 17 is a block diagram of a third embodiment of the system.

Furthermore, as shown in FIG. 17, a voice recognition system 227 may operate to translate audible sounds made by the participant 24 into machine language to control processing functions of the computer 9. The voice recognition system includes a microphone 39 worn by the participant that transmits a signal representing audible sounds over an associated conductor with an input Jack arranged in receiving relationship to the voice recognition printed circuit board. Alternatively, a conventional over-the-air radio frequency transmitter and associated electronics are located in communicating relationship with the microphone. In this manner the participant's voice signals are transmitted over-the-air to a corresponding receiver in communicating relationship to the voice recognition system. A board level voice recognition system of a type utiized in system 1 is available from Speech Systems, Batavia, Ill., as the Electronic Audio Recognition System. The boards may be mounted in the rack of the host computer 9, or in a separate chassis in communicating relationship with computer 9. The voice recognition system 227 operates with computer 9 to convert the voice signals into machine language to affect the model 14 of system 1.

The monitored information from input system 10 via conductors 82 is used to modify standard computer graphics algorithms of the computer 9. This preferably comprises a laser-disc based or other fast-access digital storage graphic imagery medium. Typically, the viewer of either the HMD assembly or large display assembly may interact with the virtual model 14 by issuing suitable commands to the computer 9 by manipulative means or sensors attached to his fingers (e.g. DataGlove, TM). Based on such manipulation, the spatial coordinates of the virtual model can of course be changed to give the impression of movement relative to the viewer.

3) IMAGE PROCESSING FOR DISTRIBUTION AND DISPLAY

Once the computer 9 has updated the world model 14 a given field or fields of view are selected in the computer and transmitted to each display unit 70 (FIG. 16) or units (70 to the nth), and each audio speaker 35 for presentation to a participant. Display units 70 may consist of conventional 31, stereographic 32 or autostereogrphic 33, or holographic 34 television or projection display units. Typically, a single or two views are sampled by the computer for display on the HMD 11. Typically six adjacent and independent views are sampled by the computer 9 for display on the large presentation assembly 12.

In FIG. 15 thru 18 computer 9 includes a video processing means 18, such as a "VideoSplitter/2" TM printed circuit board, that is programmed to select six independent and adjacent fields of view of the world model 14a for display on the large display assembly 12. The video processing means is in communicating relationship with the display processor and raster processor printed circuit boards. The raster processor comprises a board level unit that includes VLSI processors and graphics system memory. The data received by the raster processor from the output bus of the geometry processor 17 printed circuit board and data management system of computer 9 is scan-converted into pixel data, then processed into the frame buffer. Data in the frame buffer is then transmitted into the display processor of computer 9. Image memory is interleaved among the parallel processors such that adjacent pixels are always being processed by different processors. The raster processor contains the frame buffer memory, texture memory, and all the processing hardware responsible for color allocation, sub-pixel anti-aliasing, fogging, lighting, and hidden surface removal. The display processor processes data from the digital frame buffer and processes the pixels thru digital-to-analog converters (DACs) to generate an analog pixel stream which may then be transmitted over coaxial cable to display units 31, 32, or 33 as component video. The display processor supports programmable pixel timings to allow the system to drive displays with resolutions, refresh rates, and interlace/non-interlace characteristics different from those of the standard computer 9 display monitor. The display processor has a programmable pixel clock with a table of available video formats (such as 1280×1024 at 60 Hz Non-interlaced NI or VGA (640×497 at 60 Hz NI), NTSC, PAL, and HDTV). All printed circuit boards comprising the fourth processing means 18 may be held in the chassis of the computer 9 and generally of a type such as the Reality-Engine TM host integrated computer system, and including the IRIS Performer TM software environment available from Silicon Graphics, Inc. of Mountain View CA.

Each of the six fields of view selected by computer 9 correspond to imagery representing a 90 degree square field of regard. Corresponding square fields 71a–71f (FIG. 14) of regard are displayed adjacent to one another and form a cube such that imagery representing a continuous 360 degree field of view scene is displayed about the participant. Video signals representing each of the six fields of view are transmitted over a respective channel of the video processor 18 to an appropriate dislay unit 70a–70f or corresponding image segment circuit means 72 for additional processing.

FIG. 17 illustrates an embodiment of system 1 in which image segment circuit means 72 incldes image control units 73a–73f which operate to distribute the images comprising spherical coverage to the large display assembly 12. The function of the digital processing circuitry means is to accept an incoming television signal and to display it over an array of display units 11 so that the resulting image appears as it would on a single very large screen TV that completely and continuously surrounds the viewer.

In FIG. 17 computer 9 transmits each of the six fields of view over a respective channel of the "VideoSplitter" TM to a corresponding image control unit 73a–73f. The electronic video control system 72a–72f accepts the incoming video signal and partitions and processes it for display on the display units 70a1–70f9. This partitioning is referred to as segmenting the image. Each respective image control unit processes its repective image into image segments 71a1–71f9. Each segment is transmitted from the image control unit to predetermined adjacent display units such that a continuous panoramic scene is displayed about the participant on the display units of the large display assembly.

Within each image controller 73a–73f is a central processing unit (CPU) which executes software commands to affect the processing of the images in each framestore memory of framestore cards. The CPU's of each image controller are connected by an internal bus to each respective framestore card. The software commands read by the CPU may be pre-recorded onto optical disk, videotape, or image controller by use of a conventional microcomputer or computer workstation 9. The microcomputer or computer workstation preferably includes a keyboard for an operator to enter software commands to the image controllers to affect image display. Software commands consist of time code and program code for control of the displayed picture. The microcomputer or computer workstation can also be operated to input software commands that specify the picture aspect ratio to be scanned for display. In this manner the signals representing model 14a may be segmented by the image controller into image segments. The video signals representing each framestore cards picture segment is then transmitted to a corresponding display unit 70. The number of picture segements that the image controller can segment the composite picture into varies and determines the maximum number of display units that can be accommodated. Preferably, image segments are pre-formated by the camera system 1 or computer 9 processor 18 to correspond to the picture segmentation accomplished by the image controller.

Image segment circuit means 72, including assoicated cables, display units, audio system, and so forth of the type generally utilized in FIG. 17 of the system 1 is marketed by DELCOM USA, Philadelphia, Pa. and includes image controller units 73a–73f sold as the Station Pro and Universal; and systems from North American Philips Inc., of New York, N.Y. under the name VIDIWALL TM.

Other multiple display unit wall arrays that may be incorporated to form assembly 12 within the present system 1 include that described in U.S. Pat. No. 5,010,413 by Bahr, Inc., U.S. Pat. No. 4,890,314 by Judd et al., U.S. Pat. No. 4,974,073 by Inova, U.S. Pat. No. 4,974,073 by Inova, U.S. Pat. No. 5,016,109 by Gaylord, U.S. Pat. No. 4,734,779 by Levi et al., and the MediaWall TM available from RGB Specturm of Alameda, Calif., Vidiwall TM available from Phillips of Holland, TeleWall Delcom 256 model available from Nurnberger Medientecnick GmbH of Germany, and VideoWall TM available from Electronic of Minneapolis, Minn. Large display assemblies compatable with the present invention are described in detail in U.S. Pat. No. 5,130,794 by the present inventor.

As disclosed by Hooks, U.S. Pat. No. 4,463,380 and in numerous other prior art, the perspective of the beings 14a, objects 14b, and scenes 14cu displayed to the participant 24 are calculated to provide a correct perspective appearance to the participant. To achieve a participant-centered perspective, in either the HMD assembly 11 or large display assembly 12, off-axis perspective projection is calculated. Off-axis perspective is calculated based on the position and orientation of the participants head and eyes 75. The simplest derivation alters a standard on-axis perspective projection by performing two mathematical transformations of model 14a coordinates that are the equivialent to the translation, contraction, and expansion with respect to the fixed origin and fixed coordinate system. First, points are sheared in a direction parallel to the projection plane, by an amount proportional to the point's distance from the projection plane. Then, points are scaled along the axis perpendicular to the projection plane. In this fashion, perspective is calculated by the computer means 18 based on the participants position anywhere in the viewing space. Not only is the perspective distorted based upon the participants location in the viewing space relative to the virtual model 14a, but imagery is also distorted to compensate for the angle from which the viewer observes the imagery on each display unit 70 to the nth. For both reasons, perspective may be grossly distorted to make the subject or scene appear natural from a participant-centered perspective.

Furthermore, as disclosed by Waldern, U.S. Pat. No. 4,984,179 and in numerous other prior art, movement of the virtual model 14 may be made relative. A slight movement of the viewers head may be translated by the computer to move beings, objects, or the scene represented as the virtual model only slightly to dramatically based on algorithms preprogrammed into the computer 9.

4) PROCESSING SYSTEM EMBODIMENTS

In FIGS. 15 input means 2 transmits data to either computer 9a and/or 9b. Computer 9a transmits signals to a HMD assmbly 11. Computer 9b transmits signals to the large display assembly 12. Participant 24a and 24b each operate interactive devices associated with system 10a and 10b, respectively, to transmit position data to their respective computers 9a and 9b. Position and orientation data from either participant may be transmitted by conventional interface means between computers 9a and 9b, or interactive input systems 10a or 10b to computer 9a and 9b in order to update the computer generated model 14. Alternatively, both participants may operate their respective computer independently and not be networked together in any manner.

Alternatively, as shown in FIG. 16, a single computer 9 is operated to render a computer generated model for both the viewer of the HMD assembly 11 and large display assembly 12. Each participant 24a and 24b operate interactive input systems 10a and 10b respectively devices to affect the model 14.

Assume for example, the 3-D digitizing system 1 comprises a systems electronic unit, keypad, footswitch, stylus, and model table. The system electronics unit contains the hardware and software necessary to generate magnetic fields, compute the position and orientation data, and interface with the host computer 9 via an RS-232C port. The keypad is a hand-held, multikey alphanumeric terminal with display that is used to command data transmission, label data points, transmit software commands, and receive and display host computer 9 messages. The foot-operated switch is used to transmit data points from the digitizer to the host computer 9. The stylus is a hand-held stylus that houses a magnetic field sensor and is used to designate the point to be digitized. The operator places the stylus tip on the point to be digitized and depresses the foot switch or keypad to collect x, y, z coordinates of an object, being, or to define the background of the scene that constitutes the subject. The points are then selectively connected by lines within the computer 9 to construct 3-D wireframes. The 3-D wireframes 55 form a data base which is stored in the memeory 25a of the computer 9. The model table is a free-standing 40" high model table used as the digitizing surface. The table houses the electronics unit and the magnetic field source (transmitter). The volume of space above the table is specifically calibrated at time of manufacture and this data reside in the electronic units memory. A type of 3-D digitizing system utiilized is generally of the type manufactured by Polhemus Inc. of Colchester, Vt. as the 3SPACE Digitizer.

FIG. 13 illustrates a subject vase 13 to be modeled in the computer 9. The computer is configured to recieve input imagery 56 and shape data 55 from the input sources 2. Subject imagery 56 of the vase recorded by the panoramic camera system 6 and vase shape data derived from operating the digitizer system 7 are combined by operating the computer 9. As shown in FIG. 8b, 9b, and 10 the computer is operated to texture map image segments of the recorded image of the vase onto 3-D wireframe 55 of the vase previously constructed by operating the 3-D digitizing system 7. Once the texture mapping rendering is accomplished each rendered object (e.g. a vase), being (e.g. a person), or scene (e.g. temple and seascape) is placed in the computers memory 25a as rendered models 14a. A type of video input and output sub-system for combining 3-D graphics with digital video as described above is manufactured by Silicon Graphics of Mountain View, Calif. under the name VideoLab2 TM. The system allows digitized directly to the screen at real-time rates of 25 or 30 frames per second or stored on disk in memory of mass storage 25a.

Concurrent with shape and image processing, the accoustical signatures 5c of a subject 13 are recorded. FIG. 13 diagramatically illustrates a sample accoustical signature of a vase. The accoustical signature of the vase is derived by manipulating the vase in the real world and recording the sounds the vase makes. For instance the vase may be handled, scratched, hit, or even broken in order to render sounds by various accoustical signatures. Those signatures form the audio world model 14b. Accoustical signatures are linked to subjects in the visual world model 14b. The accoustical signatures recorded by microphones 39a–39f of the audio input system 1 are converted from an analog signal to a digital audio format and may be stored in the audio processing means mass storage 25b. Alternatively, audio storage 25b may consist of accoustical signatures stored on conventional audio tape or disc and accessed from corresponding audio tape and disc players. Mass storage 25b is connected by suitable conductors and in communicating relationship with audio computer processing system 23. When an action, such as a person breaking the vase occurs in the world model 14a occurs, a corresponding audio representation is pre-programmed to occur in the accoustical world model 14b. The stereo audio signal is typically converted from a digital to stereo analog signals and read out to the stereo headphones in the participants HMD 11 or to speaker systems associated with each side of the large display assembly 12.

Figure 14:
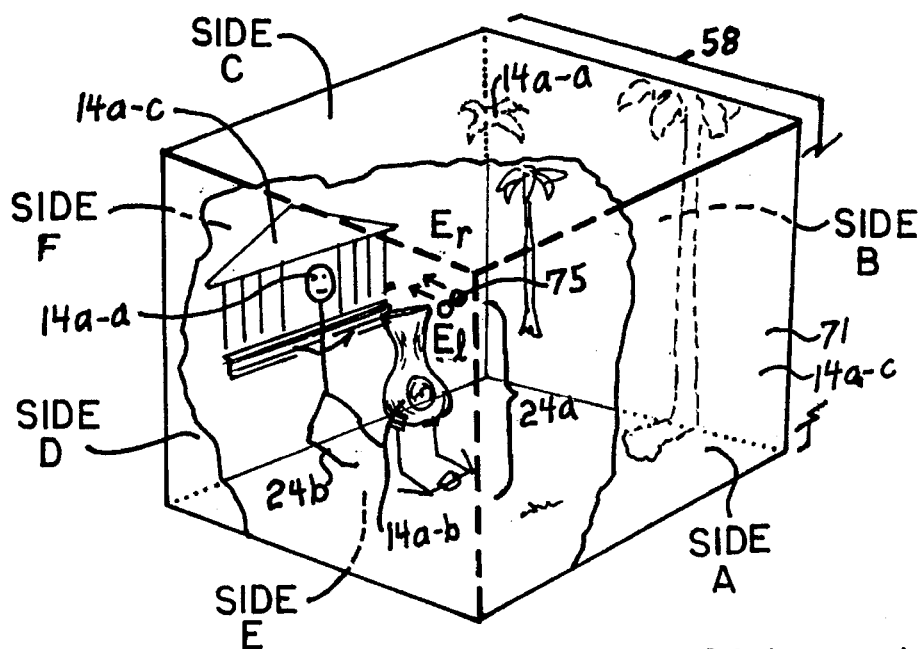
FIG. 14 is a perspective, partially diagramatic view showing an image based virtual model generated for audio-visual presentation by the visual signal processing means of system 1.

FIG. 14 diagramatically illustrates a computer generated world model 14 which the viewer can enter by the use of interactive input system 10 and audio-visual means 2. The system comprises imagery, shape, and audio signatures recorded from objects in the real world and then translated and represented in the computer generated world. By combining position and orientation data received via conductors 75 (for the head sensor) and El and Er (for the left and right eye sensors) the computer 9 determines the current field of view for the participant 24 and his or her line of sight. The images transmitted to the display unit's 70 to the nth are of a virtual model 14 having predetermined spatial coordinates within the display assemblies. With the movement of each position sensor relative to the wearer and with each variation of the direction in which the sensor wearer is looking data is transmitted to the computer 9 via conductors 82a and 82b. Whereby two images 80q and 80h are received over conductors for display on the HMD 11 and six images 80a–80f are transmitted over conductors for display on the large display assembly 12. Only the portion of the texture mapped imagery comprising the 3-D model 14 within the helmet wearer's 24 field of view is transmitted to the HMD's 11. Two images are calculated so as to present a stereoscopic view of the virtual model 14a corresponding with what would be seen if the virtual model were a real object from the helmet wearer's current standpoint. With respect to the large display assembly 12 the participant observes imagery within his or her actual field of view as displayed by the six display units 81a–81f. The six display units display a virtual model corresponding with what would be seen by the viewer if the virtual model were a real object from the viewers current standpoint.

Still refering to FIG. 14, the location and angular position of the participant's 24 line of sight are calculated by computer 9. Three-dimensional algorithms are operated upon so that the observer is effectively enclosed within the model 14a. Typically the model is generated by rendering data word or text files of coordinates comprising the vertices of the surface faces which form the model 14a. With the participant at a known position relative to both the model 14a–b(the vase) and the center and the three-dimensional world 14 which is to be occupied by the participant the angular orientation of the participant can be derived using basic trigonometry. The projection of the model is made by computing the perspective position of a point and subsequently drawing it on a display unit.

Referring again to FIGS. 15 and 16, computer 9 transmits processed signals to the HMD assembly 11 which the viewer wears. An important part of signal processing means 3 is at least one interactive input device 10. Device 10 continuously monitors the participant. The position system 10 comprises a head sensor 76a, a right data glove sensor 76b worn on the participants right hand Hr, a left data glove sensor 76c worn on the participants left hand Hl, a source unit 77, a systems electronics unit 78, and conductors 83, and 84 that interconnect the system. The source acts as a fixed source module and is energised by a suitable power source and transmits a low frequency electrical field. The sensors are small and modular. The head sensor 76a is mounted on a band worn on the viewers head, and the glove sensors 76b and 76c are mounted integral to the right and left glove, respectively. The sensors sample the field generated by the source. The sensor and the transmitter are both connected to an electronics decode circuit 78 which decodes the signals from the sensors and computes each sensor's position and orientation in angular coordinates. The device thus provides data as to both the position and orientation of the viewers head, left and right hand. The information is passed via conductor 82 to the computer 9. A type of system generally compatible with the present invention is manufactured by Polhemus of Colchester, Vt., as the 3SPACE TM Tracker and Digitizer. Additionally, there may be built into the head band two eyeball movement tracking systems, or eye sensors which monitor movements of the wearer's eyeballs and transmit signals representing these movements to computer 9 via condutors. A type of eye tracking system generally compatible with the present invention is manufactured by NAC of England, UK as the Eye Mark Recorder, Model V (EMR-V).

A slightly different position sensing arrangement is incorporated for the large display assembly 12 in that the participant wears a head band which holds a position sensor 76a. Other than that, the position sensor system 10a mounted on participant 24b in assembly 12 operates in the same manner as the position sensing system 10b operated by participant 24b wearing the HMD assembly 11.

In FIG. 16 computer 9 includes computer image processing means 18 for sampling out up to eight independent views within the model 14 for video output. Typically, each output signal is transmitted to a display unit 70a–70h. The circuit means 18 samples out two independent views 70g and 70h for display on the left and right displays of the viewers HMD 11, and samples out six independent contiguous views 70a–70f for display on each side of the six sides of the large display assembly 12. It should be noted that by decreasing the number of displays the computer 9 and associated circuit means 18 is able to increase the display resolution because more processing memory can be generated for the remaining displays. A type of image segment circuit means 18 compatible with and integral with the present invention is generally of a type manufactured by Silicon Graphics Inc. of Mountain View, Calif. under the name VideoSplitter/2 TM.

FIG. 17 is a more automated embodiment of the system 1 in which a 3-D subject is rendered by a first processing means 15 for fusing the image signals 5a and microwave signals 5b from the subject 13. The fusion of the image and microwave signals by means 15 results in 3-D model segments 26a. A panoramic 3-D camera system 1 and panoramic 3-D digitizing system 7 comprises the panoramic input system 1. Arrays 40 and array assemblies 44 similar to those shown in FIGS. 4 thru 7 are preferably incorporated position and hold sensors in place. A plurality of image and microwave sensors are positioned inward about a subject 13 to form adjacent coverage 42. Likewise, a plurality of image and microwave sensors are positioned in an outward facing manner to achieve adjacent coverage 42 of a subject. A target 3-D subject exists in space in the real world. The outputs of image and microwave sensors are combined by image processors 15 and 16 of computer 9. The image sensor is composed of one or more cameras 37 which consist of an aperture and a light sensitive element such as a charge-coupled device (CCD) array 53. The light sensitive element converts the sensed image into an analog video signal 5a. The analog video signal is transferred to the low-level image processor of means 15 via a coaxial cable.

The low-level image processor is an electronic circuit that may be implemented as a general purpose computer with specialized programming or as a series of specialized circuit boards with a fixed function. The low-level image processor collects the analog video for each frame and converts it to a digital form. This digital image is an array of numbers stored in the memory of the low-level image processor, each of which represents the light intensity at a point on sensing element of camera. The low-level image processor may also perform certain filtering operations on the digital image such as deblurring, histogram equalization, and edge enhancement. These operations are well-known to those skilled in the art.

The digital images, thus enhanced, are transferred via a digital data bus to the high-level image processor of means 15. The high-level image processor may also be either a hard-wired circuit or a general purpose computer. The high level image processor takes the enhanced digital image and attempts to extract shape information from it by various means including shape-from-shading, or in the case where multiple cameras are used, stereopsis or photometeric stereo. Again these are well-known operations to those skilled in the art. When multiple cameras are used in the image acquisition and processing system, the multiple images are combined at the high-level image processor. Alternatively, the images may be combined optically by the use of a panoramic camera system shown in FIG. 3, and previously discussed herein. The image processor processes an incomplete surface model of the unknown object. The surface model is a list of digitally stored data, each of which consists of three numbers that are the x, y, and z locations of a point on the object's surface. The incompleteness of the surface model may result from regions on the object's surface that are, for some reason, not understood by the high-level image procesor. The incomplete surface model is passed on to the initializer included as part of processing means 15 by a digital data bus.

The initializer is a general-purpose computer of digital circuit that "fills in" the portions of the surface model left incomplete by the high-level image processor. The unknown areas of the surface model are computed by surface functions such as B-splines that depend on some numerical parameter p. The surface functions are represented digitally in a form that both the initializer and the computer understand. The surface functions along with the complete surface model are passed on to the computer by a digital data bus. The computer will determine the correct value of the paramater p in the manner hereafter described.

Concurrently with collection of the images by cameras, a radar cross-section (RCS) of the unknown subject 13 is being measured by the radar system 38. The radar 38 functions as a 3-D shape input system 7. The radar 38 consists of a radar processor, antennas 85, and waveguides 86. The radar processor is a widely available device, and all of the functions described here can be performed by a unit such as the Hewlett-Packard 8510 Network Analyzer. The method by which they may be performed is described in Hewlett-Packard's product number #8510-2. The radar processor generates a microwave signal that is transmitted along the waveguide and radiated by the transmitting antenna. The electromagnetic field is diffracted by the object and collected by the receiving antenna. The diffracted signal is transmitted back to the radar processor by a waveguide. The radar processor of system 7 computes the RCS of the unknown subject 13. The RCS is represented digitally by the radar processor, and transferred to the computer processing means 15 by a digital data bus 5b.

The computer 15 performs the comparisons and iterations using two pieces of widely available software. The first is the MINPACK package of non-linear minimization programs published by Argonne National Laboratory, and the second is the Numerical Electromagnetic Code (NEC) available from Ohio State University. The NEC code generates theoretical approximations of the RCS of the object using the surface model produced by the initializer. The MINPACK program "1mdif0" uses these approximate RCSs to compute the correct value of the parameter p by an iterative scheme known as "nonlinear least squares". This method allows computation of the correct value of p by minimizing the differences between the observed RCS acquired by the radar system and the theoretical RCS computed by the NEC code from the incomplete surface model. Using the correct value of p, along with the incomplete surface model and surface functions from the initializer, the computer 15 generates a complete surface model segment for each adjacent field of regard 42 of the overlapping 41 radar and image sensors. Preferrably, a plurality of means 15 operate in parallel to derive segments 26 representing all sides of a 3-D subject 13 simultaneously. As with all computer programs, they must be written for the particular hardware and carefully debugged. U.S. Pat. No. 5,005,147 by Krishen et al. discloses a "Method and Apparatus for Sensor Fusion" generally of a type that is comparable with the present invention herein referred to as the sensor fusion system that forms the first processing means 15.

The output from each of the sensor fusion systems is transmitted to a solid-modeling computer system which forms the second processing means 16 of the system 1 shown in FIG. 17. The computer system includes a high speed central processing unit (CPU), one or more terminals, mass storage, for instance magnetic tape or disk drives, a solid-state memory, one or more communication interfaces (such as a network interface), a high resolution video display and a printer plotter.

Mass storage of means 16 contains a database for storing solid models representing segments 26 of subjects 13 such as objects, beings, and scenes. Solid models may be represented in the database in a number of different ways, such as in the form of boundary representations, and faceted representations. Preferrably, solids are represented so that it is possible to extract information about surface patches whose disjoint union comprises the bounding surfaces of the solid.

The system operates using topology directed subdivision for determination of surface intersections. This is accomplished by the steps of obtaining a pair of surfaces from a main pool of surfaces representations and performing a mutual point exclusion test to determine if the surfaces may have an intersection. Data defining the model segments 26 obtained by the first processing means 15 are transmitted to the second processing means 16 mass storage. Included in this data is information on the surfaces representations of each model segment which is operated upon by the second processing means in determining surface matching and intersection. For those pairs of surfaces possibly having an intersection, the transversality of the surface is checked. If transversal, the intersection set is computed. For those pairs which are not transversal, recursive subdivision is performed until transversality is established or until a flatness criteria is met. A parallel processing system including a master processor and a plurality of slave processors performs the subdivision operation on the surfaces in a parallel fashion. The bounded surfaces are then processed as completely rendered 3-D objects, beings, and scenes. The resultant data defining and representing the 3-D objects, beings, and scenes is read over a conductor into the memory 25a of the third processing means 17. U.S. Pat. No. 5,014,230 by Sinha et al. discloses a "Solid-Modeling System Using Topology Directed Subdivision for Surface Intersections" generally of a type compatible with the present system 1 and referred to herein as a solid-modeling computer system that comprises the second processing means 16.

In FIG. 17 a position sensing system 10 similar to that described for use in FIGS. 2 and 3 is operated to monitor the participants position and orientation. However, it is known to those skilled in the art that various viewer interactive input systems, such as those previously described, may be incorporated to monitor the position and orientation of the veiwer.

In FIG. 17 audio signals 5c from the microphones 39a–39f are transmitted to the 3-D audio system 23. The audio system 23 outputs a stereo signal 5c corresponding to the subjects in the model 14a and the position and orientation of the participant 24. The stereo signal 79 is transmitted by a conventional stereo audio transmitter 62 to a audio stereo receiver 63 associated with stereo headphones 64 worn by the participant 24. Preferably signal 79 is transmitted over-the-air so that no conductor cables or wires encumber the participant 24. Such a stereo transmission/receiver headphone arrangement is of a conventional nature used commonly by those in the broadcast industry.

In FIG. 17 storage and geometric manipulation of the panoramic computer generated model 14 by computer 9 is the same as in FIG. 16 for the large display assembly. However, the fourth processing means 18 for processing the image for display and distribution also includes image segment circuit means 72 to partition each signal 80a–80f into sub-segments for display on an array of display units 70al–70af located on each side of the viewer. Image control units 73a–73f, whose detailed operation has been previously described, are included as part of means 72 to process the images for distribution to the display units.

d) THREE-DIMENSIONAL DISPLAY PROCESSING

Figure 18:
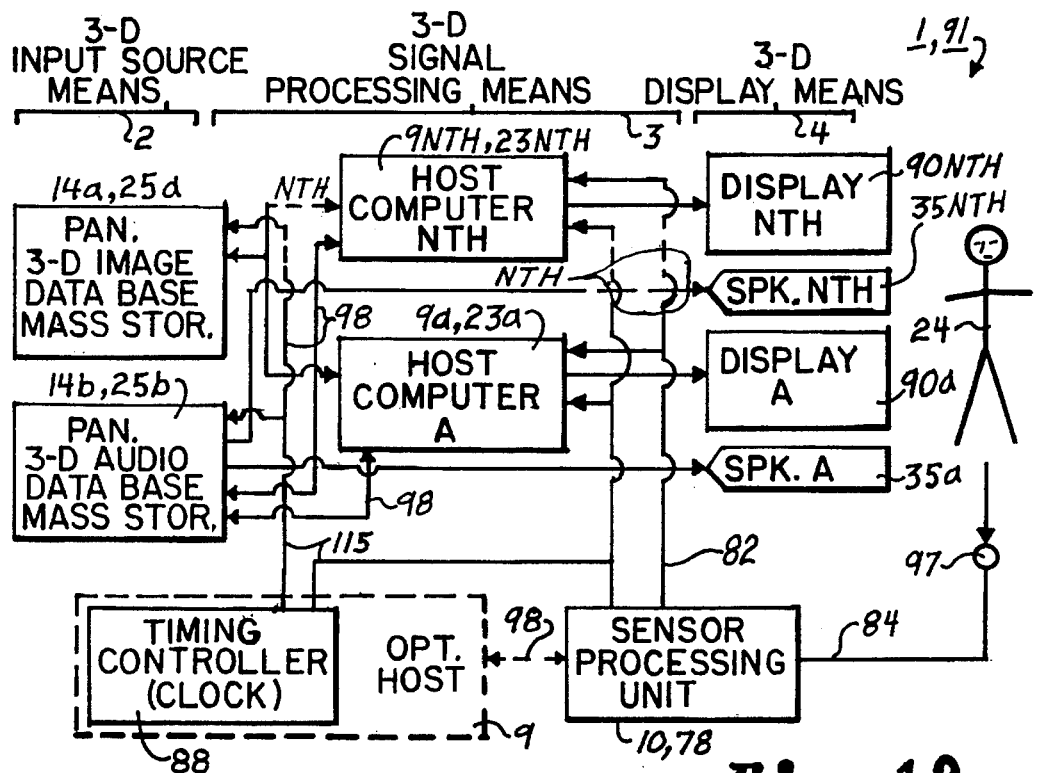
FIG. 18 is a block diagram illustrating the incorporation of a three-dimensional display system according to the present invention.
Figure 19:
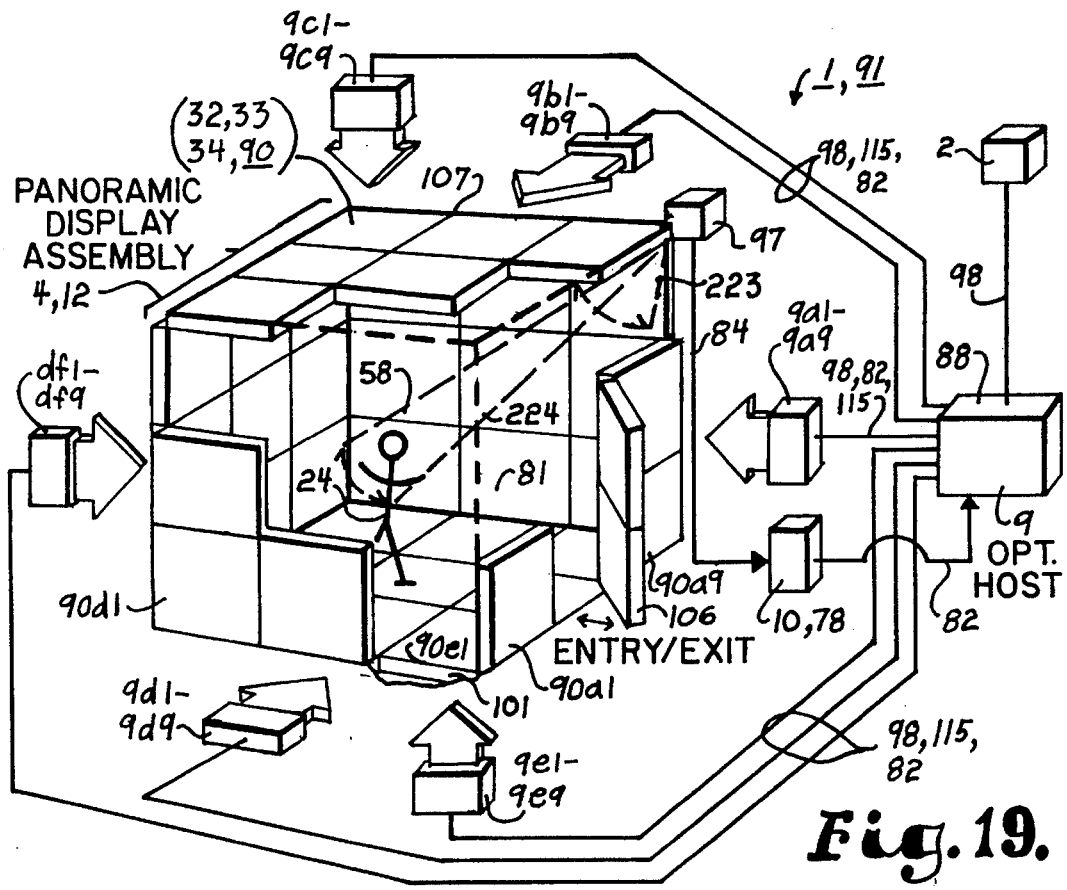
FIG. 19 is a perspective, partially diagramatic view illustrating the three-dimensional viewing system described in FIG. 18.

Referring to FIGS. 18 and 19, it will be appreciated that some embodiments of input sources 2 and signal processing means 3 allow a three-dimensional model 14a to be rendered within the computer 9 that is able to be rendered in real-time for simulation. Additionally, the model has increased realism because the model is composed directly from shape and imagery recorded from the real world as opposed to created in a traditional manner incorporating computer graphics. Most importantly, computer 9 is programmable such that multiple viewpoints of the three-dimensional model 14 may be processed out to facilitate dynamic three-dimensional display for either stereographic, autostereographic or holographic display system applications 91. Computer 9 includes the necessary firmware and software for processing and distributing 3-D images to 3-D display units 32, 33, or 34.

In such applications, a single computer is preferably used to process an adjacent segment 26a of the model 14a for each 3-D display unit 32, 33, or 34. This is recommended because of the computational intensive nature of rendering multiple viewpoints of the model. The complete world model 14a may be stored in the memory of each computer 9a to the 9nth. Alternatively the system may be configured such that each computer 9 receives only a segment 26a of the model 14a from a master computer 9 or data base 25a. Preferably a participant interactive input system 10 transmits viewer position and orientation data to each computer 9a via conventional interfaces 82. Each computer is synchronized with each of the other computers by a master clock 88 (FIG 18) transmitting a timing signal to each computer 9a to the 9nth. The timing signal may be derived from the internal clock of any computer 9. The output signals from each computer 9a1–9f9 are transmitted to each respective 3-D display unit 90a1–90f9 of the display 3-D assembly. The display units display adjacent portions of the model 26a1 of the world model 14a such that a substantially continuous stereographic, autostereographic, or holographic scene 71 is rendered before the participants eyes.

With respect to stereoscopic methods and display systems 32 compatible with system 1 which require special eye glasses; commonly, two overlapping pictures for each screen can be read out for 3-D stereoscopic effects, such as with differing filtration or polarization between the projection modules or, for a 3-D effect without glasses, showing one version of the picture slightly smaller and out of focus relative to the other. The two differing points of view are projected in a super-imposed fashion on each side of the large display assembly 12. The images are scanned out of computer 9 as separate channels by using a multi-channel video output processor 18 generally of a type aviailable from Silicon Graphics Inc. of Mountain View, Calif. as the VideoSplitter/2. Spatial separation is achieved because each of the images processed out of computer 9 is taken from a different point of view. Polarizing film is placed in front of the projectors 70a and 70b, one horizontal and the other vertical, and the polarized image is viewed with polarized eye glasses of the same orientation, resulting in each eye seeing the proper veiw as with a stereo viewfinder. The number of projection units would remain the same as the number of points of view. The distance between the point of view of the images scanned out of the computer 9 by the multi-channel processor would be approximately 6 cm, equivalent to the average distance between the pupils of human eyes.

Alternatively, a multi-mode stereoscopic imaging arrangement according to U.S. patent applications Ser. No. 7/612,494, Ser. No. 7/536,419, Ser. No. 7/561,090, and Ser. No. 7/561,141 by Faris is compatible and may be integrated with system 1. Multiple adjacent viewpoint images of the model, preferably of the left and right eye, are spatially multiplexed. The multiplexed image is applied to a micropolarizer array. The multiplexed image is demultiplexed by the viewer wearing polarized eye glasses. An advantage of Faris's system is that a single picture frame contains both left and right eye information so that conventional display units are instituted, but yield a stereoscopic image to the viewer.

Alternatively, an autostereoscopic image requiring no eye glasses may be rendered by scanning out multiple adjacent viewpoint images of the model from computer 9 and applying those images to processing means 119 and display means 33 according to U.S. Pat. No. 4,717,949 by Eichenlaub or an autostereoscopic full-color 3-D TV display system 33 incorporating a HDTV LCD color video projector and bi-plano 3-D screen with diffusion plate and lenticular screen available from NHK Science and Technical Research Labratories of Japan. Both Eichenlaub and NHK employ multiple inter-digitated columns of left and right eye images in a corduroy-type manner. The images may be interdigitated by computer 9. Alternatively, the images may be read out from computer 9 on separate channels and interdigitated by a signal mixer.

Alternatively, an autostereoscopic system includes a system in which multiple adjacent viewpoint images of the model 26a of the world model 14a are applied to processing means 119 (FIG. 1) and display means 33 according to U.S. Pat. No. 5,014,126 by Pritchard et al. The scanning path and recording rates are selected to produce motion within visio-psychological memory rate range when displayed using standard diplay units 31. Computer code is written to define the multiple adjacent viewpoint images of the model 14 and the number of frames per second that the computer 9 transmits to the display unit.

Finally, holographic systems compatible with system 1 include U.S. Pat. No. 4,834,476 by Benton which discloses a method and devices 33 for display and sampling a series of perspective views of the model corresponding to the participants 25 position that can be computed by conventional computer graphic techniques. Each computer 9a1–9nth is programmed and operated to construct a series of predistorted views of a model segment 26a of the world model 14a from image data stored in a computer memory by ray-tracing techniques. Each perspective view can then be projected with laser light onto a piece of high resolution film from the angle corresponding to its computed viewpoint, overlapped by a coherent "reference" beam to produce a holographic exposure that records the direction of the image light. After all the views have been recorded in this way, the hologram is processed and then illuminated so that each view is sent back out in the direction it was projected from, that is, toward its intended viewing location, so that a participant moving from side to side sees a progression of views as though he or she were moving around an actual object. Each adjacent holographic display unit 34a1–34f9 displays a holographic image of an adjacent corresponding portion 26a of the world model 14a.

For some applications, a holographic stereogram approach may be desirable when presenting 3-D images. In general, a stereogram consists of a series of two-dimensional object views differing in horizontal point-of-view. These views are presented to the participant in the correct horizontal location, resulting in the depth cues of stereopsis and (horizontal) motion parallax. The 2-D perspective views are generally imaged at a particular depth position, and are multiplexed by horizontal angle of view. A given holo-line in this case contains a holographic pattern that diffracts light to each of the horizontal locations on the image plane. The intensity for a particular horizontal viewing angle should be the image intensity for the correct perspective view. This is accomplished by making the amplitude of the fringe contribution a step-wise x-funtion of the intensity of each image point from each of the views. To facilitate rapid computation of stereogram-type computer graphic holograms, the precomputed tables can be indexed by image x-position and view-angle (rather than by x position and z position). Summation is performed as each of the perspective views of each segment 26a is read into each computer 9a1–9nth based on the viewpoint of the participant. The participants viewpoint is sensed by a any previously mentioned position sensing system, such as a LADAR 97, that comprises the interactive input system 10. Furthermore, the changes in x can be indexed by look up tables of the computer 9. Alternatively, a simple drawing program written by MIT in which the user can move a 3-D cursor to draw a 3-D image that can be manipulated. Stereogram computer graphic holograms, such as those computed and displayed on the MIT real-time holographic display system, and which produce realistic images, may be computed utilizing sophisticated lighting and shading models and exhibiting occlusion and specular reflections in system 1.

Each computer 9a1–9f9 may comprise the following system and methods demonstrated by the MIT, Media Laboratory. The methods of bipolar intensity summation and precomputed elemental fringe patterns are used in the hologram computation for holographic real-time display. A type of computer 9a1–9f9 for holographic processing 220 is generally of a type known as the Connection Machine Model 2 (CM2) manufactured by Thinking Machines, Inc. Cambridge, Mass. Each computer 9a1–9f9 employs a data-parallel approach in order to perform real-time computer generated hologram computation. This means that each x location on the hologram is assigned to one of 32k virtual processors. (The 16k physical processors are internally programmed to imitate 32k "virtual" processors.) A Sun 4 workstation is used a front-end for the CM2, and the parallel data programming language C Paris is used to implement holographic computation. In this manner, each image segment 26a1–26a9 may be computed for each associated holographic dispaly unit 34a1–34f9.

Once each computer 9a1–9af has rendered holographic signals for output the signals are transmitted from each supercomputer. The signals represent the optical fringe patterns that would be present in a 3-D hologram composed of 192 horizontal lines. Each line is composed of 16 other lines and has 32,000 picture elements. To simplifiy the computing task, some information is omitted from the hologram. The light signals are converted into a radio-frequency signal, amplified, and sent to three transducers attached to a tellurium-dioxide acousto-optical crystal. Here the signals are converted into sound waves that travel through the crystal at about twice the speed of sound, altering the index of refraction as they change pitch and advance. A laser beam passing throught the crystal is defracted just as it would be passing through a hologram. A spinning mirror—18 facets on the edge of a thick brass polygon—"freezes" this holographic information. The mirror spins in the opposite direction and at the same speed as the sound waves. When a ciruit counts 16 lines, it sends a signal to a vertical scanner, an electromechnaically driven mirror that moves down one step for the next scan line. A lens focused on the spinning polygon magnifies the 192 scan lines into a visible image. Simple images, such as a wireframe cube, can be updated by the computer in about 0.3 second, so animation is possible, showing the 3-D cube spinning against a black background. A series of animated images that is precomputed, may be stored on magnetic discs, then rapidly downloaded for smooth, flicker-free animation. The front viewing face of each 3-D display unit 90a1–90f9 is faced inward toward the participant such that a panoramic scene of spherical coverage is presented to the participant.

If the images are accurately computed and registered, the resulting image looks like a solid three-dimensional subject. Such a composite or synthetic hologram is termed a "holographic stereogram." It mimics the visual properties of a true hologram even though it lacks the information content and interferometric accuracy of a true hologram.

It is forseen that other types and improved holographic processors and larger holographic display units similar to that described above may be incorporated in the present system 1. It is further forseen within the scope of the system 1 that similar and other holographic processors and diplay units may operate on the same basic image based virtual model for holographic image generation, and use the basic assembly 4 arrangement for holographic display. It is also forseen that projection hologrphic display units may be situated about the viewing space 58 to project 3-D images into the viewing space to add increased realism to the images viewed by the participant.

4) TELECOMMUNICATIONS EMBODIMENT

Figure 20:
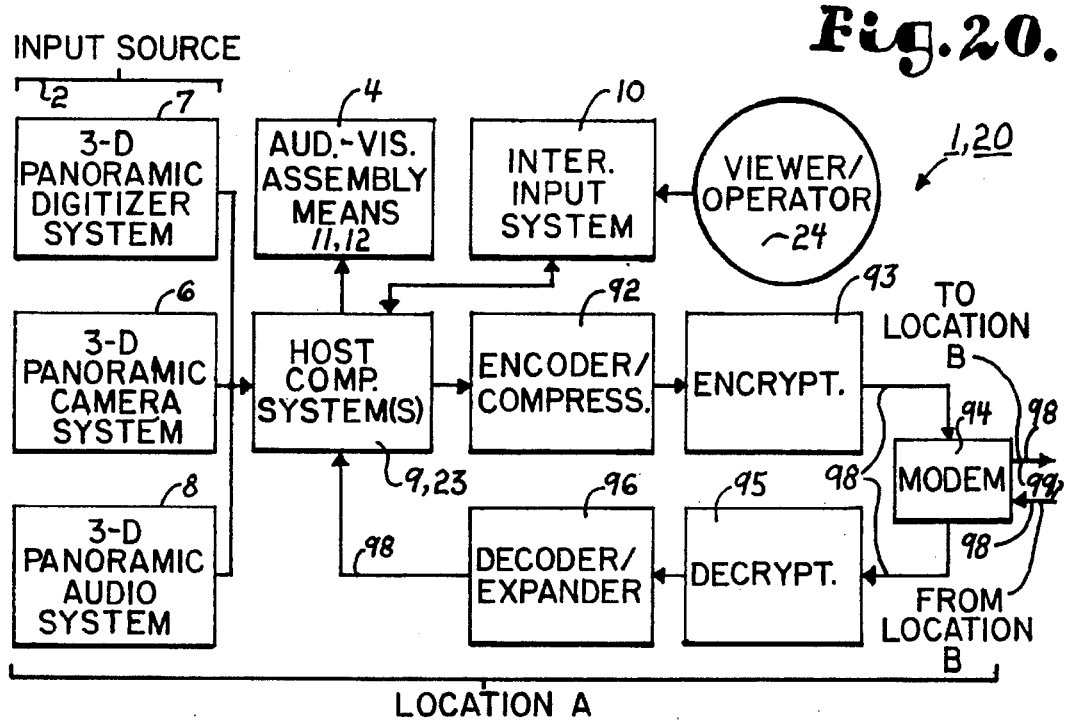
FIG. 20 is a block diagram of an embodiment of the present invention including a telecommunications system.
Figure 21:
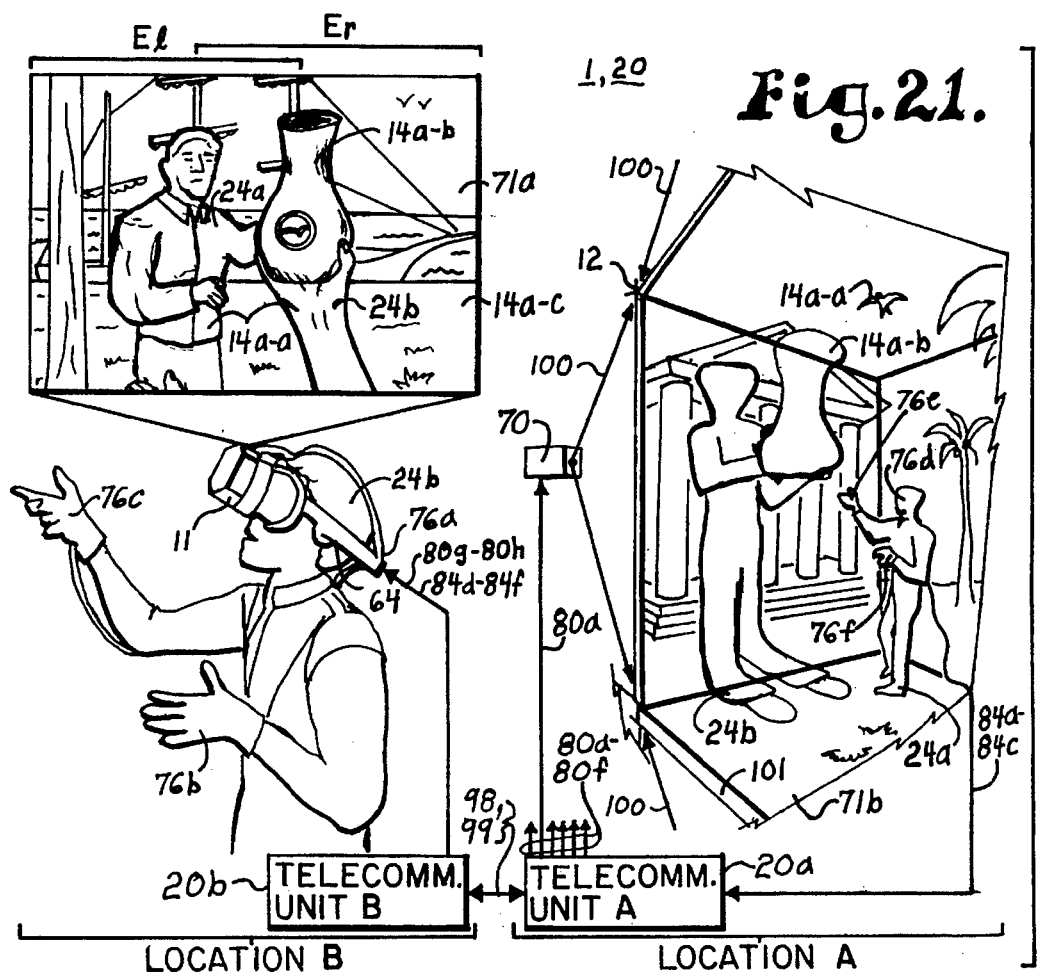
FIG. 21 is a perspective, partially diagramatic view illustrating the telecommunications embodiment according to FIG. 20.

FIGS. 20 and 21 illustrates an embodiment in which system 1 is used in a telecommunications application. A virtual reality/telepresence teleconferencing system 20 includes computer 9 workstations, interactive input system 10, source 2 information derived from an input means consisting of a panoramic camera system 6, 3-D panoramic digitizer system 7, and 3-D panoramic audio system 1, a head mounted display assembly 11 and/or large display assembly 12, and telecommunications peripheral apparatus 92–96 to allow interconnection of two or more terminals to engage in teleconferencing via digital data networks 98. The digital data telecommunications network may be part of a local area network (LAN) or wide area network (WAN) known to those in the telecommunications industry. Typically a frame grabber interfaces each camera of input system 6 with its computer 9. Signals output from the computer 9 are encoded and compressed before being input to a telephone line via a modulator/demodulator 94. A decoder 96 is connected between the modulator/demodulator 94 and the computer for decoding compressed video signals received by the modulator/demodulator means from the telephone line 99 so that the signals may be displayed on a video display conected to the computer.

The telecommunications system 20 is configured to send and switch from video to high-resolution graphics, or voice modes without breaking connection. For example the participant may choose to transmit imagery data and/or shape data, or can update a virtual environment by simply passing position coordinates to update the position of actual live 13 or prerecorded modeled 14 beings, objects, or scenery modeled at remote locations. Alternatively, a plurality of computer workstations 9 and telecommunications apparatus 92–96 may operate in parallel to transmit data over a plurality of telephone lines to facilitate the transmission of large volumes of information. For instance, the imagery of each side of the large display assembly 12 may be transmitted over a separate telephone line 99 to each corresponding display unit 70a–70f.

The telecommunications system 20 can be added as an internal peripheral to the workstation, or may be added as a stand alone device which conntects to the computer 9 via a serial or parallel interface. Additionally, the telecommunications system may be used in a one, two, or many-way ("broadcast") mode. U.S. Pat. No. 5,062,136 by Gattis et al. is generally of the type incorporated and compatible with the present system 1.

5) VEHICLE EMBODIMENTS

Figure 22:
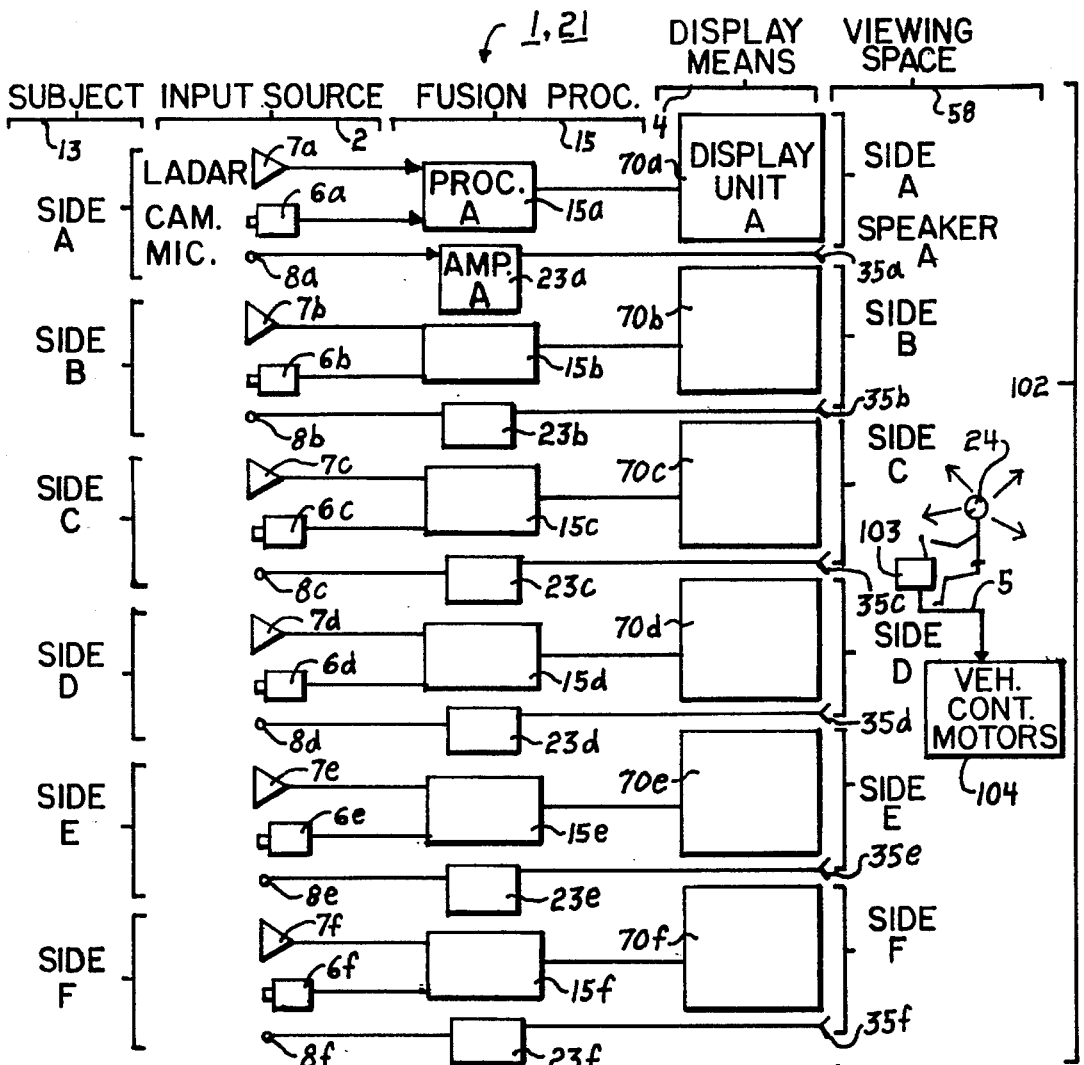
FIG. 22 is block diagram illustrating an embodiment of the present invention wherein a host vehicle control system with a panoramic sensor, processing, and display system provides telepresence to a viewer/operator for control of the host vehicle.
Figure 23:
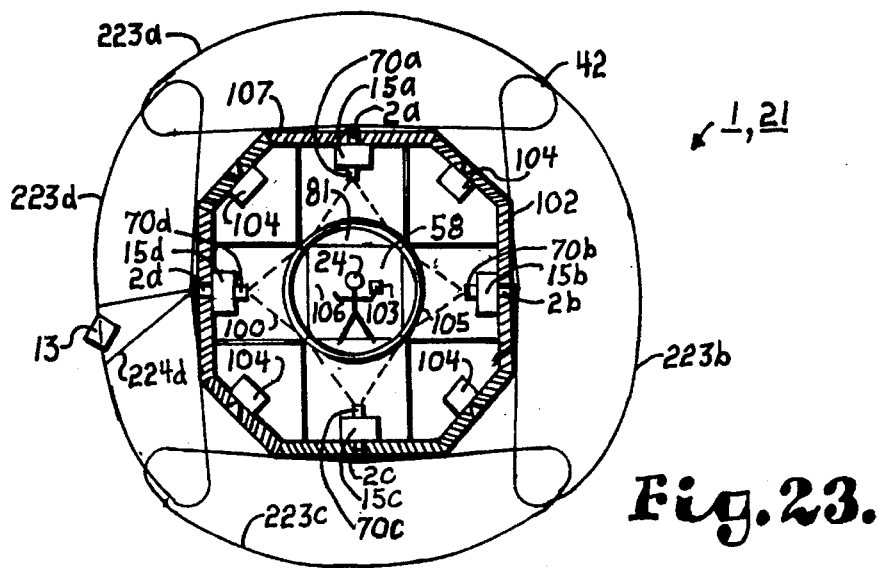
FIG. 23 is a sectional view of a host vehicle incorporating the present invention shown in FIG. 22.

It is foreseen that display system 1 may be used with various kinds of vehicles. In FIGS. 22 and 23 input means 2 comprises a panoramic camera system 6a–6f, panoramic laser-radar (LADAR) system 7a–7f, and a panoramic audio system 8a–8f. Each LADAR 7a–7f of the system includes a registered visible video channel. The LADAR system searches, acquires, detects, and tracks a target subject 13 in space. The LADAR initially searches a wide field of view 223. The LADAR includes focusable optics that subsequently may focus on a subject in a narrow field of view 224. Once the subject 13 is resolved each LADAR video processor 15a–15f associated with each LADAR system 7a–7f switches from a search mode to determining the subject 13 orientation and position. A fusion processor 15a–15f (e.g. a SGI Computer Workstation or Macintosh PC) of each LADAR system includes an object recognition capability which correlates, identifies, and registers subjects detected by each LADAR's laser ranging system. Imagery from each LADAR is fused with the camera imagery 6a–6f by a computer 15a–15f. The fused data from each computer 15a–15f is transmitted to an associated display unit 70a–70f of assembly means 2. The scenes are displayed about the viewer/operator 24. Each input source, computer fusion processor, and display unit operates on an image with a 90 degree field of view. All systems may be synchronized by the master clock integral to any one of the computers 15a–15f. This is typically done by conventional software program to synchronize the signals of the machines 15a–15f and the use of common wiring network topologies such as an Ethernet, Token Ring, or Arcnet to interconnect machines 15a–15f.

FIG. 23 illustrates the arrangement as configured on a module of a space station. It should be understood that various system 1 arrangements can be placed on any suitable vehicle platform. The participant operates interactive control devices 103 to pilot the host vehicle 102 in response to the audio and visual scenery displayed around the participant. Additionally, the system 15 may include object recognition processors. A LADAR 7a and camera 6a of a type compatible for incorporation with the present invention is manufactured by Autonomous Systems Inc. of Orlando, Fla.

Figure 24:
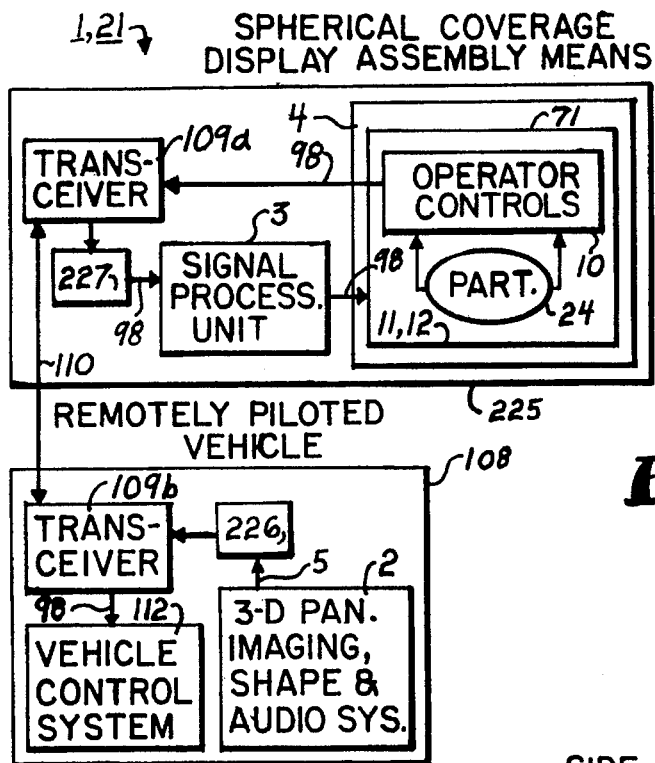
FIG. 24 is a block diagram illustrating an embodiment of the present invention wherein a remote control system for a remotely piloted vehicle with a panoramic sensor system transmits a three-dimensional panoramic scene to a control station for processing and spherical coverage viewing in order to assist the controller in piloting the teleoperated vehicle.
Figure 25:
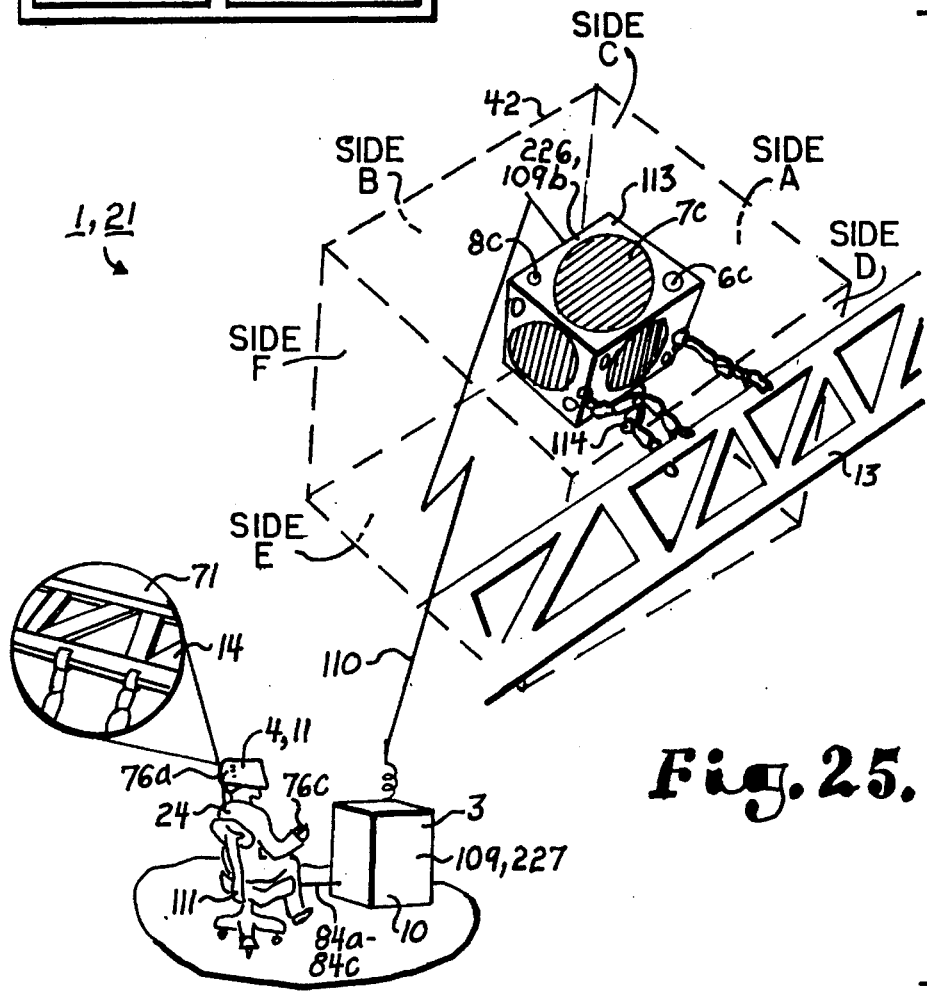
FIG. 25 is a perspective, partially diagrammatic view illustrating the remote control three-dimensional viewing system described in FIG. 24.

Similarly it is forseen that the system could be used to remotely pilot a vehicle, such as described in FIGS. 24 and 25. In FIG. 25 a 3-D representation of the scene is recorded by a sensor array 36a–36f such as that described in FIGS. 6 and 7. The sensor array housing 40 is incorporated into the outer skin of a remotely piloted or teleoperated vehicle 108.

In FIG. 24 the vehicle 108 incorporates a video data compression system 226 to transmit visual information sensed about the vehicle over the air to operate a control station 225. An over the air radio frequency digital communications system 226 transmits 1000 to one compressed full color signals at a 60 hertz data transmission rate. Imagery data from a panoramic camera system 6 is transmitted to an output communications buffer. The frame buffer reads out the digital data stream to the radio frequency tranceiver 109b for transmission to the transceiver 109a. Tranceiver 109a is located at the control station 325. The transceiver 109a recieves the over the air signal and reads the signal into the input communications buffer. The input communications buffer reads out a digital data stream to a data signal decompression (or data expander) device. The decompressed signal is read to signal processing unit 3 for processing and distribution. The processed image is transmitted from processor 3 to display units 11 or 12. Shape data and audio data may also be transmitted over the digital over the air data link. A teleoperated vehicle 226 data transmission and control system compatable with the present system 1 is manufactured by Transition Research Corporation of Warren, Mich. The panoramic camera system 1 like that in FIGS. 2–7 replaces the camera system of the Transition Research Corp. camera arrangement. A single or plurality of channels may comprise the system 21.

The participant 24 of the control station 325 interacts with the real world remote environment by viewing the displayed scene and operating devices of the interactive input system 10. The control signals are transmitted from the system 10 from tranceiver 109a to tranceiver 109b to vehicle control systems 112. The control system includes data processing means that operates on the transmitted signal to actuate control surfaces and motors 113, and manipulators onboard the teleoperated vehicle. In this manner the participant remotely controls the teleoperated vehicle 108.

It is further forseen that the sensor array 36 may be mounted onboard unpiloted vehicles such as robots. The sensors of each sensor array would be faced outward from the robot. The sensors of each sensor array would be in communicating relationship with the robots computer processing means. Sensed data would be fused and operated upon by the robot to assist the robot in negotiating and interacting within its environment.

DISPLAY ASSEMBLY MEANS

1) HEAD MOUNTED DISPLAY ASSEMBLY

The processing means 18 of computer 9 generates signals 80 transmitted to the HMD 11 via conductor lines and these are converted into two images on respective high-resolution, miniature display units 70a–70b housed within the HMD assembly. The display units are mounted on opposite sides of the HMD assembly in direct communication with the respective left and right eyes of the viewer wearing the HMD assembly. HMD assemblies of the type generally compatible with the present invention are manufactured by VPL Research Inc. of Redwood City, Calif. as the EyePhone TM HRX System; by LEEP Technologies Inc., Waltham, Mass. as the Cyberspace 2; by Sony Corporation, Inc. of Japan as VisorTron TM; and that sighted in U.S Pat. No. 5,034,809 by Katoh and assigned to Palca, Inc, Tokyo, Japan.

2) LARGE DISPLAY ASSEMBLY

Alternatively, a large display assembly 12 is provided to receive and display the virtual model to a viewer. The large display assembly is configured in a polyhedral arrangement. The display assembly comprises a structural assembly that encloses the participants head, upper body, or entire body. The assembly is designed to facilitate a single or plurality of viewers. The floor 101 (FIG. 19) and its' associated display units beneath, to the sides and over the viewer are integrated so the participant is presented with a substantially continuous scene for viewing. The structural framework, supports, and associated fasteners 107 are integrated with the display assembly such that they are hidden from the participant and hold the assembly together. Display systems and optical enlargement means mounted on spring-hinged doors, latches, or rollers, allow the entry and exit assemblies 106 to move back and forth in an open and closed position. The floor 101 on which the viewer is situated is preferably of a rigid transparent material through which the viewer sees the viewing side of the display systems or optical enlarging assemblies. Alternatively, the viewing side of the display systems or optical enlarging assemblies is constructed of materials that support the participant. The material on which the viewer is situated is preferably formed of a transparent rigid glass, plastic, or glass-plastic laminate.

The viewing surface 81 of the display units may be curved or flat and face inward toward the center of the viewing space. The display units 70 typically comprise image projection units and associated rear projection screens, cathode ray tube display units, or flat panel displays. Single display units 70a–70f may comprise a side of the viewing space, or a plurality of display units 70a1–70f9 may make up a side of the viewing space 58.

As shown in FIG. 19 stereographic display unit 32, autostereoscopic display units 32, or holographic display units 33, and associated screens, audio components, and entry and exit ways may be supported in the similar manner as conventional display units and screens as described in U.S. Pat. No. 5,130,794 by the present inventor.

As shown in FIG. 22 the entire display assembly 11 or 12 may be located on any suitable vehicle.

It is to be understood that while certain forms of the present invention have been illustrated and described herein, it is not to be limited to the specific forms or arrangement of parts described and shown.

What is claimed and disired to be secured by Letters Patent is as follows:

1. A display system for virtual interaction with recorded images and comprising:
   (a) input means including:
      (1) a plurality of positionable sensor means of mutually angular relation to enable substantially continuous coverage by said sensor means of a three-dimensional subject; and
      (2) sensor recorder means communicating with said sensor means and operative to store and generate sensor signals representing said subject;
   (b) signal processing means communicating with said sensor means and said recorder means, receiving said sensor signals from said recorder means, and operable to texture map virtual images represented by said sensor signals onto a three-dimensional form;
   (c) a panoramic audio-visual display assembly means communicating with said signal processing means and enabling display to a viewer of the texture mapped virtual images;
   (d) viewer control means communicating with said signal processing means, including at least one interactive input device, and enabling interactive manipulation of said texture mapped virtual images by a viewer thereof operating said interactive input device; and
   (e) said signal processing means further including:
      (1) a host computer for manipulation of a computer generated world model; and
      (2) manipulation software associated with said host computer for assigning action to subjects in said computer generated world model based upon actions by another subject in said computer generated world model.

2. A system according to claim 1 wherein:
   (a) the plurality of sensor means are positioned in an inwardly facing mutually angular relation to enable substantially continuous coverage by said sensor means of a given subject.

3. A system according to claim 1 wherein:
   (a) the plurality of sensor means are positioned on a housing means in outwardly facing, mutually angular relation to enable substantially spherical coverage by said sensor means.

4. A system according to claim 1 where said sensor means comprises:
   (a) a plurality of positionable objective lens means of mutually angular relation to enable substantially continuous coverage by said lens means of a given subject;
   (b) light sensitive means optically communicating with said lens means and receiving respective optical images therefrom and generating image signals representing said optical images; and
   (c) said sensor recorder means includes image recorder means communicating with said light sensitive means and operative to store said image signals.

5. A system according to claim 1 where said sensor means comprises:
   (a) a plurality of microphones positioned in mutually angular relation to enable continuous coverage by said microphones, said microphones providing audio signals representing sounds sensed thereby; and
   (b) said sensor recorder means includes audio recorder means communicating with said microphones and operative to store and replay said audio signals.

6. A system according to claim 1 wherein said sensor means includes:
   (a) a plurality of three-dimensional digitizing sensor means positioned in mutually angular relation to enable continuous coverage by said digitizer means; and
   (b) said sensor recorder means includes three-dimensional digitizer recording means communicating with said digitizing sensor means to store and replay signals representing a three-dimensional representation of said subject.

7. A system according to claim 1 wherein signal processing means includes:
   (a) interface apparatus for interfacing video and digital signals to a computer in a telecommunications system to allow a plurality of computer terminals to engage in teleconferencing via a digital data network.

8. A system according to claim 7 including a non-contact sensor array which includes:
   (a) a plurality of arrays oriented in an outwardly facing mutually angular relation to enable substantially spherical coverage of a three-dimensional subject.

9. A system according to claim 7 including a non-contact sensor array which includes:
   (a) a plurality of arrays oriented in an inwardly facing mutually angular relationship to enable substantially continuous coverage of a three dimensional subject.

10. A system according to claim 1 wherein:
    (a) said signal processing means includes:
       (1) said host computer including a pixel programmable display generator; and
       (2) a video display generator operatively connected to said display assembly means; and
    (b) said viewer control means including graphics input means operatively connected to said computer and operated by a viewer; said computer generating or altering images in response to said graphic input means; and said display assembly means displaying said generated or altered images.

11. A system according to claim 1 wherein signal processing means comprises:
    (a) a plurality of host computers which each process a segment of a panoramic subject for display.

12. A system according to claim 1 wherein:
    (a) said signal processing means includes stereoscopic processing means to generate two independent views taken from viewpoints a selected distance apart of a portion of said images mapped onto said three-dimensional form and communicate said views as stereoscopic video signals; and (b) said display assembly means includes a pair of display units of said assembly means operable to display said signals respectively on said display units as a stereoscopic image to said viewer.

13. A system according to claim 1 wherein said audio-visual display assembly means includes:

(a) an autostereoscopic audio-visual display system in which the participant requires no eye glasses.

14. A system according to claim 1 wherein said audio-visual display assembly means includes:

(a) a holographic display system.

15. A system according to claim 1 wherein the audio-visual display assembly means includes:

(a) a plurality of flat panel display systems.

16. A system according to claim 1 wherein the audio-visual display assembly means includes:

(a) a plurality of cathode ray tubes.

17. A system according to claim 1 wherein the audio-visual display assembly means includes:

(a) a plurality of video projection display units and associated projection screens.

18. A system according to claim 1 wherein the panoramic audio-visual display assembly means includes:

(a) a head mounted display assembly.

19. A system according to claim 1 wherein the panoramic audio-visual display assembly means comprises:

(a) structural support means for securing a plurality of display units about a viewer, supporting a planar floor on which the viewer is situated, and supporting an entry and exit portion of said assembly means;

(b) said plurality of display units being supported by said structural support means such that said display units face inward to the viewer, said display units being operable to display images;

(c) said display units being arranged about a viewer such that a viewer views a respective portion of a composite image in substantially any viewable direction surrounding the viewer;

(d) said planar floor being positioned close to a lower side of said assembly means, said planar floor being transparent and having display units positioned therebelow in such orientations as to enable viewing images displayed on such display units through said floor, and said planar floor supporting said viewer; and (e) said entry and exit portion of said assembly means being positioned laterally of said viewer.

20. A system according to claim 1 wherein said signal processing means includes image segment circuit means for partitioning an image output by said signal processing means and said audio-visual display assembly means comprises:

(a) a head mounted display assembly receiving a processed video signal which has been processed by said processing means for display on said head mounted display assembly; and (b) a second audio-visual display assembly including a plurality of display units receiving respective processed video signals representing image segments of a composite image from said segment circuit means; and (c) each said assembly means being arranged such that a respective viewer views a respective portion of a scene of substantially spherical coverage in any viewable direction.

21. A system according to claim 1 wherein viewer control means includes:

(a) a non-contact participant position sensor system.

22. A system according to claim 1 and including:

(a) a video teleconferencing system interfaced to said signal processing means.

23. A system according to claim 1 wherein the system includes:

(a) a conventional stereophonic radio transmitter which transmits a stereophonically modulated radio signal to a conventional stereophonic radio receiver having conventional stereophonic headphones connected thereto.

24. A system according to claim 1 and including:

(a) view processing means for providing a plurality of independent views of a computer generated world model and transmitting said views as separate video signals to another device for processing or display.

25. A system according to claim 1 wherein the signal processing means includes:

(a) a television production system.

26. A system according to claim 1 wherein the signal processing means includes:

(a) a participant mechanical feedback device, actuated by participant actions and actions by subjects programmed into a virtual model.

* * * * *